(12) United States Patent
Oguz et al.

(10) Patent No.: US 8,340,183 B2
(45) Date of Patent: Dec. 25, 2012

(54) DIGITAL MULTIMEDIA CHANNEL SWITCHING

(75) Inventors: Seyfullah Halit Oguz, San Diego, CA (US); Amit Rohatgi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1472 days.

(21) Appl. No.: 11/744,775

(22) Filed: May 4, 2007

(65) Prior Publication Data
US 2008/0273596 A1 Nov. 6, 2008

(51) Int. Cl.
*H04N 7/12* (2006.01)
*H04N 11/02* (2006.01)

(52) U.S. Cl. .............................. 375/240.13; 375/E7.023

(58) Field of Classification Search .................. None
See application file for complete search history.

(56) References Cited

U.S. PATENT DOCUMENTS

| 6,480,541 | B1 | | 11/2002 | Girod | |
|---|---|---|---|---|---|
| 6,560,370 | B2 | | 5/2003 | Ribas-Corbera et al. | |
| 6,909,466 | B1 | * | 6/2005 | Scheffler et al. | 348/459 |
| 7,075,986 | B2 | | 7/2006 | Girod | |
| 7,116,830 | B2 | | 10/2006 | Srinivasan | |
| 2005/0017991 | A1 | * | 1/2005 | Yamazaki et al. | 345/690 |
| 2006/0013320 | A1 | * | 1/2006 | Oguz et al. | 375/240.27 |
| 2006/0039471 | A1 | | 2/2006 | Dane et al. | |
| 2006/0262864 | A1 | * | 11/2006 | Shi et al. | 375/240.27 |
| 2007/0073779 | A1 | * | 3/2007 | Walker et al. | 707/104.1 |
| 2007/0086527 | A1 | * | 4/2007 | Yan | 375/240.24 |
| 2009/0257485 | A1 | * | 10/2009 | Youn | 375/240.01 |
| 2010/0278268 | A1 | * | 11/2010 | Lee et al. | 375/240.16 |
| 2010/0284469 | A1 | * | 11/2010 | Sato et al. | 375/240.16 |

FOREIGN PATENT DOCUMENTS

| JP | 06086265 | | 3/1994 |
|---|---|---|---|
| JP | 2006304107 | A | 11/2006 |
| JP | 2007081518 | A | 3/2007 |
| WO | WO2007038695 | | 4/2007 |

OTHER PUBLICATIONS

Wenjun Zeng et al., "Rate Shaping by Block Dropping for Transmission of MPEG-precoded Video over Channels of Dynamic Bandwith", 1996, pp. 385-393, ACM Multimedia 96, Boston, Massachusetts.
Bormans, J. et al.: "Video Coding with H.264/AVC: Tools, Performance, and Complexity," IEEE Circuits and Systems Magazine, IEEE Service Center, New York, NY, US, vol. 4., No. 1, Jan. 2004, pp. 7-28, XP011111220, ISSN: 1531-636X.
International Search Report, PCT/US2007/068371—International Searching Authority—European Patent Office—Apr. 21, 2008.
Written Opinion, PCT/US2007/068371—International Searching Authority—European Patent Office—Apr. 21, 2008.

* cited by examiner

*Primary Examiner* — Christopher Revak
(74) *Attorney, Agent, or Firm* — Ryan N. Farr

(57) ABSTRACT

The disclosure relates to techniques for coding a channel switch frame used for switching between channels of digital multimedia content. In particular, an encoding device may code channel switch frame to exclude one or more blocks of pixels that may be reconstructed at a desired fidelity at a decoding device using one or more spatial error concealment algorithms. Excluding the one or more blocks of pixels of the channel switch frame that can be reconstructed at a desirable fidelity reduces the amount of bandwidth necessary to code the portion of the channel switch frame, thus allowing more efficient utilization of available bandwidth.

80 Claims, 8 Drawing Sheets

DIGITAL MULTIMEDIA CHANNEL SWITCHING

TECHNICAL FIELD

The disclosure relates to digital multimedia and, more particularly, techniques for switching between channels of digital multimedia content.

BACKGROUND

Different techniques for broadcasting digital multimedia have been developed and optimized for reception by mobile wireless devices. Such techniques include Forward Link Only (FLO), Digital Multimedia Broadcasting (DMB), and Digital Video Broadcasting—Handheld (DVB-H). Digital multimedia broadcasting typically relies on one or more digital multimedia encoding standards, such as Moving Picture Experts Group (MPEG)-1, MPEG-2, MPEG-4, International Telecommunication Union (ITU) H.263, or ITU H.264. The ITU H.264 standard corresponds to MPEG-4, Part 10, entitled "Advanced Video Coding." These coding standards generally support transmission efficiency of multimedia sequences by encoding data in a compressed manner.

Several broadcasting techniques deliver content as a series of physical or logical channels, providing a content selection experience similar to a conventional television. Each physical or logical channel carries digital data that encodes audio/video streams, audio/video clips, or other informational content. To switch channels, the mobile device acquires digital data, e.g., in the form of one or more packets or frames, from a selected channel and decodes the data to present the content to the user. Prolonged delays in selecting and presenting a channel are undesirable, and undermine the "channel surfing" experience to which users are accustomed. Accordingly, reduction of channel switching time is a significant concern in broadcasting.

SUMMARY

In certain aspects of this disclosure a method for processing multimedia data comprises inter-coding a frame of multimedia data, wherein the inter-coded frame includes a plurality of blocks of pixels and intra-coding a channel switch frame that comprises at least a portion of the multimedia data coded in the inter-coded frame, wherein the channel switch frame is coded to exclude one or more of the plurality of blocks of pixels of the inter-coded frame that can be reconstructed at a desired fidelity using a spatial error concealment algorithm.

In certain aspects, an apparatus for processing multimedia data comprises an encoding module that inter-codes a frame of multimedia data. The inter-coded frame includes a plurality of blocks of pixels. The encoding module also intra-codes a channel switch frame that comprises at least of a portion of the multimedia data coded in the inter-coded frame. The channel switch frame is coded to exclude one or more blocks of pixels of the inter-coded frame that can be reconstructed at a desired fidelity using a spatial error concealment algorithm.

In certain aspects, an apparatus for processing multimedia data comprises means for inter-coding a frame of multimedia data, wherein the inter-coded frame includes a plurality of blocks of pixels. The apparatus further comprises means for intra-coding a channel switch frame that comprises at least a portion of the multimedia data coded in the inter-coded frame. The channel switch frame is coded to exclude one or more of the plurality of blocks of pixels of the inter-coded frame that can be reconstructed at a desired fidelity using a spatial error concealment algorithm.

In certain aspects, a computer-program product for processing multimedia data comprising a computer readable medium having instructions thereon, the instructions comprising code for inter-coding a frame of multimedia data, wherein the inter-coded frame includes a plurality of blocks of pixels and code for intra-coding a channel switch frame that comprises at least a portion of the multimedia data coded in the inter-coded frame, wherein the channel switch frame is coded to exclude one or more of the plurality of blocks of pixels of the inter-coded frame that can be reconstructed at a desired fidelity using a spatial error concealment algorithm.

In certain aspects, a method for processing multimedia data comprises obtaining a plurality of coded frames of multimedia data associated with a first channel, wherein the plurality of coded frames include an inter-coded frame and a channel switch frame that comprises intra-coded multimedia data that corresponds to at least a portion of the multimedia data coded in the inter-coded frame. Moreover the method comprises
in response to an event, decoding blocks of pixels of the channel switch frame corresponding to the intra-coded multimedia data. The method also comprises reconstructing one or more blocks of pixels not coded within the channel switch frame using at least one spatial error concealment algorithm.

In certain aspects, an apparatus for processing multimedia data comprises a selective decoding module that obtains a plurality of coded frames of multimedia data associated with a first channel, wherein the plurality of coded frames include an inter-coded frame and a channel switch frame that comprises intra-coded multimedia data that corresponds to at least a portion of the multimedia data coded in the inter-coded frame and in response to an event, decodes the channel switch frame corresponding to the intra-coded multimedia data. The apparatus also includes a spatial error concealment module that reconstructs one or more blocks of pixels not coded within the portion of the channel switch frame using at least one spatial error concealment algorithm.

In certain aspects, an apparatus for processing multimedia data comprises means for obtaining a plurality of coded frames of multimedia data associated with a first channel, wherein the plurality of coded frames include an inter-coded frame and a channel switch frame that comprises intra-coded multimedia data that corresponds to at least a portion of the multimedia data coded in the inter-coded frame, means for decoding, in response to an event, blocks of pixels of the channel switch frame corresponding to the intra-coded multimedia data and means for reconstructing one or more blocks of pixels not coded within the channel switch frame using at least one spatial error concealment algorithm.

In certain aspects, a computer-program product for processing multimedia data comprising a computer readable medium having instructions thereon, the instructions comprising code for obtaining a plurality of coded frames of multimedia data associated with a first channel, wherein the plurality of coded frames include an inter-coded frame and a channel switch frame that comprises intra-coded multimedia data that corresponds to at least a portion of the multimedia data coded in the inter-coded frame. The instructions further comprising code for decoding, in response to an event, blocks of pixels of the channel switch frame corresponding to the intra-coded multimedia data and code for reconstructing one or more blocks of pixels not coded within the channel switch frame using at least one spatial error concealment algorithm.

The details of one or more examples are set forth in the accompanying drawings and the description below. Other features, objects, and advantages will be apparent from the description and drawings, and from the claims.

DETAILED DESCRIPTION

The disclosure relates to digital multimedia and, more particularly, techniques for coding a channel switch frame (CSF) used for switching between channels of digital multimedia content. In particular, an encoding device may code a channel switch frame to exclude one or more blocks of pixels (referred to herein as "blocks") that may be sufficiently reconstructed at a decoding device using one or more spatial error concealment (SEC) algorithms. For example, the encoding device may code the channel switch frame to exclude one or more blocks that may be reconstructed at a desired fidelity, i.e., with a fidelity that is greater than or equal to a threshold. Excluding the one or more blocks of the channel switch frame that can be reconstructed at the desired fidelity using spatial error concealment reduces the amount of bandwidth necessary to code the channel switch frame, thus allowing more efficient utilization of available bandwidth.

In some aspects, the encoding device may be aware of the specific spatial error concealment algorithm or algorithms used by a decoding device and determine whether the blocks can be reconstructed at the desired fidelity using the spatial error concealment algorithms of the decoding device. The encoding device may, for example, determine the sufficiency of reconstruction, e.g., the fidelity, based on measures such as sum of absolute differences (SADs), sum of squared differences (SSD), sum of transformed differences (STDs), peak signal-to-noise ratio (PSNR), or other measurement between and encoded-decoded version of the block and the version of the block generated via SEC. As one example, the encoding device may determine that the block can be reconstructed with at the desired fidelity when the block can be reconstructed with a PSNR that is greater than or equal to 30 dB.

Alternatively, the encoding device may be unaware of the specific spatial error concealment algorithms supported by the decoding device and determine which of the blocks may be sufficiently reconstructed by the decoding device by analyzing information associated with the blocks to determine whether the blocks can be sufficiently interpolated. The encoding device may determine whether the blocks can be sufficiently interpolated using information within the same frame and, in particular, information available from adjacent blocks. The assessment of whether the blocks can be sufficiently interpolated may be, for example, based on a signal smoothness or directivity evaluation, thus de-coupling the evaluation from a specific SEC algorithm. In some embodiments, for example, the encoding device may use block classification techniques to determine the complexity of the block. The encoding device may determine whether there is any directional structure and classify the block as capable of being sufficiently interpolated when a directional structure exists within the block.

Figure 1:
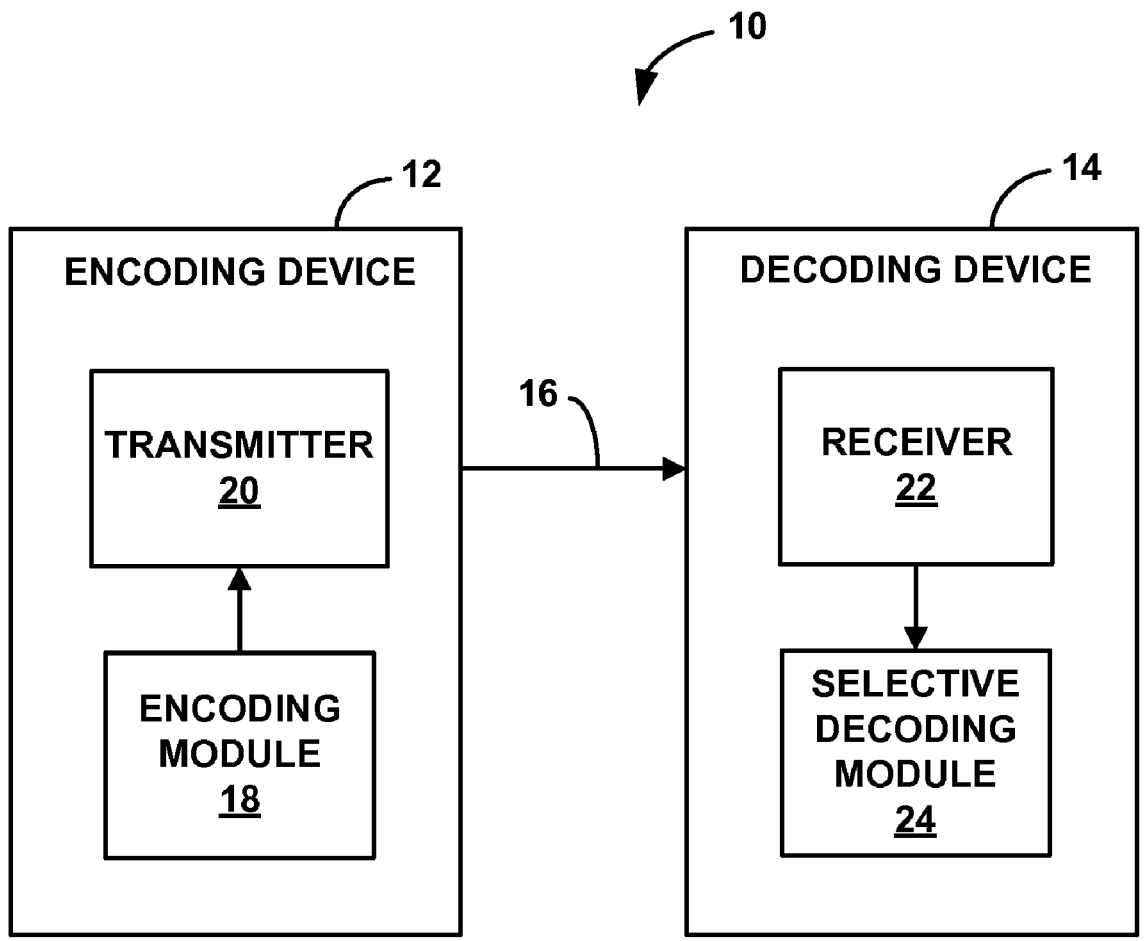
FIG. 1 is a block diagram illustrating a video encoding and decoding system that employs the channel switching techniques described herein.

FIG. 1 is a block diagram illustrating a video encoding and decoding system 10 that employs the channel switching techniques described herein. Encoding and decoding system 10 includes an encoding device 12 and a decoding device 14 connected by a transmission channel 16. Encoding device 12 encodes one or more sequences of digital multimedia data and transmits the encoded sequences over transmission channel 16 to decoding device 14 for decoding and, possibly, presentation to a user of decoding device 14. Transmission channel 16 may comprise any wired or wireless medium, or a combination thereof.

Encoding device 12 may form part of a broadcast network component used to broadcast one or more channels of multimedia data. As such, each of the encoded sequences may correspond to a channel of multimedia data. As an example, encoding device 12 may form part of a wireless base station, server, or any infrastructure node that is used to broadcast one or more channels of encoded multimedia data to wireless devices. In this case, encoding device 12 may transmit the encoded data to a plurality of wireless devices, such as decoding device 14. A single decoding device 14, however, is illustrated in FIG. 1 for simplicity.

Decoding device 14 may comprise a user device that receives the encoded multimedia data transmitted by encoding device 12 and decodes the video data for presentation to a user. By way of example, decoding device 14 may be implemented as part of a digital television, a wireless communication device, a gaming device, a portable digital assistant (PDA), a laptop computer or desktop computer, a digital music and video device, such as those sold under the trademark "iPod," or a radiotelephone such as cellular, satellite or terrestrial-based radiotelephone, or other wireless mobile terminal equipped for video streaming, video telephony, or both. Decoding device 14 may be associated with a mobile or stationary device. In a broadcast application, encoding device 12 may transmit encoded video to multiple decoding devices 14 associated with multiple users.

In some aspects, for two-way communication applications, encoding and decoding system 10 may support video telephony or video streaming according to the Session Initiation Protocol (SIP), International Telecommunication Union Standardization Sector (ITU-T) H.323 standard, ITU-T H.324 standard, or other standards. For one-way or two-way communication, encoding device 12 may generate encoded multimedia data according to a video compression standard, such as Moving Picture Experts Group (MPEG)-2, MPEG-4, ITU-T H.263, or ITU-T H.264, which corresponds to MPEG-4, Part 10, Advanced Video Coding (AVC). Although not shown in FIG. 1, encoding device 12 and decoding device 14 may be integrated with an audio encoder and decoder, respectively, and include appropriate multiplexer-demultiplexer (MUX-DEMUX) modules, or other hardware, firmware, or software, to handle encoding of both audio and video in a common data sequence or separate data sequences. If applicable, MUX-DEMUX modules may conform to the ITU H.223 multiplexer protocol, or other protocols such as the user datagram protocol (UDP).

In some aspects, this disclosure contemplates application to Enhanced H.264 video coding for delivering real-time multimedia services in terrestrial mobile multimedia multicast (TM3) systems using the Forward Link Only (FLO) Air Interface Specification, "Forward Link Only Air Interface Specification for Terrestrial Mobile Multimedia Multicast," published as Technical Standard TIA-1099, August 2006 (the "FLO Specification"). However, the channel switching techniques described in this disclosure are not limited to any particular type of broadcast, multicast, or point-to-point system.

As illustrated in FIG. 1, encoding device 12 includes an encoding module 18 and a transmitter 20. Encoding module 18 receives one or more input multimedia sequences that include one or more frames of data and selectively encodes the frames of the received multimedia sequences. Encoding module 18 receives the input multimedia sequences from one or more sources (not shown in FIG. 1). In some aspects, encoding module 18 may receive the input multimedia sequences from one or more video content providers, e.g., via satellite. As another example, encoding module 18 may receive the multimedia sequences from an image capture device (not shown in FIG. 1) integrated within encoding device 12 or coupled to encoding device 12. Alternatively, encoding module 18 may receive the multimedia sequences from a memory or archive (not shown in FIG. 1) within encoding device 12 or coupled to encoding device 12. The multimedia sequences may comprise live real-time or near real-time video, audio, or video and audio sequences to be coded and transmitted as a broadcast or on-demand, or may comprise pre-recorded and stored video, audio, or video and audio flows to be coded and transmitted as a broadcast or on-demand. In some aspects, at least a portion of the multimedia sequences may be computer-generated, such as in the case of gaming. Although the techniques of this disclosure are described as being performed on multimedia data, similar techniques may be used to process voice communication and data communication in addition to multimedia.

In any case, encoding module 18 encodes and transmits a plurality of coded frames to decoding device 14 via transmitter 20. Encoding module 18 may encode the frames of the input multimedia sequences using one or more coding techniques. For example, encoding module 18 may encode one or more of the frames using intra-coding techniques. Frames encoded using intra-coding techniques are coded without reference to other frames, and are often referred to as intra ("I") frames. Encoding module 18 may also encode one or more of the frames using inter-coding techniques. Frames encoded using inter-coding techniques are coded with reference to one or more other frames. The inter-coded frames may include one or more predictive ("P") frames, bi-directional ("B") frames, or a combination thereof. P frames are encoded with reference to at least one temporally prior frame while B frames are encoded with reference to at least one temporally prior frame and at least one temporally future frame.

Encoding module 18 may be further configured to partition a frame into a plurality of blocks and encode each of the blocks separately. As an example, encoding module 18 may partition the frame into a plurality of 16×16 blocks. Some blocks, often referred to as "macroblocks," comprise a grouping of sub-partition blocks (referred to herein as "sub-blocks"). As an example, a 16×16 macroblock may comprise four 8×8 sub-blocks, or other sub-partition blocks. For example, the H.264 standard permits encoding of blocks with a variety of different sizes, e.g., 16×16, 16×8, 8×16, 8×8, 4×4, 8×4, and 4×8. Further, by extension, sub-blocks of any size may be included within a macroblock, e.g., 2×16, 16×2, 2×2, 4×16, 8×2 and so on. Thus, encoding module 18 may be configured to divide the frame into several blocks and encode each of the blocks of pixels as intra-coded blocks or inter-coded blocks, each of which may be referred to generally as a block. In some aspects, encoding module 18 may encode blocks within a single inter-coded frame using different coding techniques. In other words, encoding module 18 may encode some blocks in a frame of data using intra-coding techniques and other blocks in the same frame of data using inter-coding techniques, such that a frame may include both P (or B) blocks and I blocks. Thus, the term inter-coded frame, as used herein, refers to any frame in which at least a portion of the blocks are coded using inter-coding techniques.

Additionally, encoding module 18 encodes and transmits one or more channel switch frames to enhance channel switching capabilities of decoding device 14. As used herein, the term "channel switch frame" refers to an intra-coded frame of data that includes at least a portion of the multimedia data of a corresponding inter-coded frame of data. In other words, the channel switch frame may be viewed as a second coded version of at least a portion of the multimedia data of the corresponding inter-coded frame of data. In this manner, the channel switch frame is co-located with the corresponding one of the inter-coded frames, and in some cases may be decoded in place of the corresponding inter-coded frame as will be described in detail below. In operation, when a channel switch is desired, a decoding device 14 accesses a channel switch frame instead of the co-located inter-coded frame to more quickly generate video associated with a selected channel. In some aspects, however, a portion of the corresponding inter-coded frame may be decoded along with the channel switch frame.

Encoding module 18 intra-codes the channel switch frames in accordance with the techniques described herein. More specifically, encoding module 18 intra-codes the channel switch frame to exclude one or more blocks of the channel switch frame to more efficiently utilize available bandwidth. Instead of intra-coding all of the blocks in the channel switch frame, encoding module 18 skips encoding of selected blocks in the frame, thereby reducing the amount of encoded information in the channel switch frame. In particular, encoding module 18 encodes the channel switch frame to exclude one or more blocks of the channel switch frame that may be reconstructed at a desired fidelity at decoding device 14 using one or more spatial error concealment algorithms. In other words, encoding module 18 identifies blocks that, if skipped, can still be reconstructed by decoder device 14 using information from adjacent blocks within the same frame, and omits those blocks from the channel switch frame. In this manner, encoding module 18 reduces the amount of bandwidth necessary to code the channel switch frame.

In some aspects, encoding module 18 may be aware of a specific spatial error concealment algorithm or algorithms used by decoding device 14 and determine whether the blocks can be reconstructed at the desired fidelity using the spatial error concealment algorithms of decoding device 14. Encoding module 18 may, for example, determine the fidelity of the reconstructed block, e.g., the fidelity, based on a comparison between an encoded-decoded version of the block and the version of the block generated via SEC. Examples of metrics that may be used as a measure of the fidelity of the reconstructed block include SADs, SSDs, STDs, PSNRs, or other difference metric or metric that approximates the human visual perception. As one example, encoding module 18 may determine that the block can be reconstructed with at the desired fidelity when the block can be reconstructed with a PSNR that is greater than or equal to 30 dB.

Alternatively, encoding module 18 may be unaware of the specific spatial error concealment algorithms supported by decoding device 14 and determine which of the blocks may be reconstructed at the desired fidelity by decoding device 14 by analyzing information associated with the blocks to determine whether the blocks can be sufficiently interpolated by the decoding device. Encoding module 18 may determine whether the blocks can be sufficiently interpolated using information within adjacent blocks. The assessment of whether the blocks can be sufficiently interpolated may be, for example, based on a signal smoothness or directivity evaluation. In some embodiments, for example, encoding module 18 may use block classification techniques to determine the complexity of the block. Encoding module may determine whether there is any directional structure and classify the block as capable of being sufficiently interpolated when a directional structure exists within the block.

Additionally, encoding module 18 may be configured to encode at least a portion of the channel switch frame to exclude blocks that correspond to intra-coded blocks that are present in the corresponding inter-coded frame. In other words, encoding module 18 does not code blocks in the channel switch frame that correspond to intra-coded blocks in the corresponding inter-coded frame. Alternatively, encoding module 18 may encode a portion of the blocks of the channel switch frame corresponding to the intra-coded blocks of the corresponding inter-coded frame at a reduced quality instead of completely skipping the encoding of those blocks. This also reduces the amount of bandwidth used by encoding module 18 to code the channel switch frame. Encoding module 18 may utilize the extra bandwidth to enhance the quality of the blocks coded in the channel switch frame or other coded frames, or to simply reduce bandwidth consumed by the channel switch frames.

Encoding device 12 transmits the coded frames of data via transmitter 20. Encoding device 12 may transmit the channel switch frames and the other coded frames of data as in-band communications. Alternatively, encoding device 12 may transmit the channel switch frames as out-of-band communications and transmit the other coded frames of data as in-band communications. For example, encoding device 12 may embed the channel switch frames within supplemental enhancement information (SEI) messages. In some aspects, encoding device 12 may utilize scalable coding and transmit the channel switch frames in a base layer to increase the probability of reception by decoding device 14. Alternatively, encoding device 12 may transmit the channel switch frames in an enhancement layer, e.g., to balance the bandwidths of the base and enhancement layers. Transmitter 20 may include appropriate modem and driver circuitry to transmit encoded multimedia over transmission channel 16. For wireless applications, transmitter 26 includes RF circuitry to transmit wireless data carrying the encoded multimedia data.

Decoding device 14 receives the encoded data via receiver 22. Like transmitter 20, receiver 22 may include appropriate modem and driver circuitry to receive encoded multimedia over transmission channel 16, and may include RF circuitry to receive wireless data carrying the encoded multimedia data in wireless applications. In some examples, encoding device 12 and decoding device 14 each may include reciprocal transmit and receive circuitry so that each may serve as both a source device and a receive device for encoded multimedia and other information transmitted over transmission channel 16. In this case, both encoding device 12 and decoding device 14 may transmit and receive multimedia sequences and thus participate in two-way communications. In other words, the illustrated components of multimedia encoding device 10 may be integrated as part of an encoder/decoder (CODEC).

Selective decoding module 24 selectively decodes the coded frames of data received via receiver 22. Initially, selective decoding module 24 normally decodes the encoded sequences of data. In other words, selective decoding module 24 decodes the inter- and intra-coded frames of the encoded sequences as if there were no channel switch frames encoded within the sequences. However, selective decoding module 24 decodes one or more channel switch frames in place of the corresponding inter-coded frames for a channel in response to detection of an event. The event may, for example, be detection of a request to switch channels or detection of a coded data corrupting error that renders a frame difficult to decode at the desired fidelity. For example, in response to a channel switch request, selective decoding module 24 decodes one or more of the channel switch frames for the new channel instead of decoding the corresponding inter-coded frames. Because the channel switch frame comprises intra-coded blocks of data, it is independently decodable, i.e., it does not reference any other coded frames. Therefore, the channel switch frame constrains the temporal dependencies during the switching transient to ensure that the decoded frames do not appear distorted with a mix of content from the previous channel and new channel. The channel switch frames may also be used for purposes other than channel switching. For example, decoding device 14 may decode the channel switch frames in place of the corresponding inter-coded frame to stop error propagation, enable resynchronization, or permit fast forward and rewind. In this sense, the channel switch frame may function as a random access frame to support multiple functions including but not necessarily limited to channel switching.

In the case in which encoding module 18 encoded the channel switch frame to exclude blocks corresponding to the intra-coded blocks of the respective inter-coded frame, selective decoding module 24 may augment the intra-coded blocks of the portion of the channel switch frame with the intra-coded blocks of the inter-coded frame corresponding to the excluded blocks of the channel switch frame. Hence, selective decoding module 24 may produce a decoded frame using a portion of the intra-coded channel switch frame and a portion of the inter-coded frame that corresponds to the excluded blocks of the channel switch frame. Again, the corresponding inter-coded frame may be temporally correlated with the intra-coded channel switch frame, and carry inter-coded information that corresponds to the intra-coded content of the channel switch frame. The inter-coded frame ordinarily would be decoded in the course of steady state viewing a channel. When decoding device 14 has just switched to the channel, however, the intra-coded channel switch frame is decoded, either alone or in conjunction with the intra-coded blocks from the corresponding inter-coded frame, as described above.

Moreover, in the case in which encoding module 18 encoded the blocks of the channel switch frame corresponding to the intra-coded blocks of the respective inter-coded frame at a reduced quality or bit rate, selective decoding module 24 may decode the reduced quality intra-coded blocks of the channel switch frame and enhance the quality of those blocks using the corresponding intra-coded blocks of the corresponding inter-coded frame. Hence, in this case, as in the case above, selective decoding module 24 may rely on intra-coded blocks from both the channel switch frame and the inter-coded frame that corresponds to the channel switch frame.

Selective decoding module 24 reconstructs one or more blocks of the channel switch frame using one or more spatial error concealment algorithms. In particular, selective decoding module 24 reconstructs the blocks that were skipped by encoding module 18 because of the determination that those blocks can be reconstructed at the desired fidelity at decoding device 14. Decoding device 14 may reconstruct the skipped blocks based on one or more decoded blocks of the portion of the channel switch frame. Thus, decoding device 14 reconstructs the skipped blocks of pixels based on information from adjacent blocks within the same frame instead of using information from blocks of previous and/or subsequent frames. The decoded blocks of the channel switch frame may, in some cases, include a combination of the intra-coded blocks coded in the channel switch frame as well as the intra-coded blocks of the corresponding inter-coded frame that are used to augment the intra-coded blocks of the channel switch frame. Thus, the decoded blocks of the channel switch frame may be viewed to include both the intra-coded blocks coded within the channel switch frame as well as any decoded blocks used to augment the blocks of the channel switch frame.

Selective decoding module 24 combines the decoded intra-coded blocks of the channel switch frame and the reconstructed blocks to generate a decoded frame of data. Moreover, in the case in which the intra-coded blocks of the channel switch frame are augmented by the intra-coded blocks of the corresponding inter-coded frame, selective decoding module 24 may additionally combine the decoded intra-coded blocks of the corresponding inter-coded frame along with the intra-coded blocks and the reconstructed blocks of the channel switch frame to generate a decoded frame of data. Decoding device 14 may further present the decoded frame of data to a user via a display (not shown) that may be either integrated within decoding device 14 or provided as a discrete device coupled to decoding device 14 via a wired or wireless connection.

After selective decoding module 24 decodes the channel switch frame, selective decoding module 24 decodes one or more inter-coded frames following the channel switch frame without reference to any of the coded frames preceding the channel switch frame. In other words, all forward dependencies of subsequent inter-coded frames to any frames before the channel switch frame are removed to further prevent distortion due to mixing of content of the previous channel and the current channel.

In some aspects, encoding device 12 may encode, combine, and transmit portions of the multimedia sequences received over a period of time. As an example, encoding device 12 may operate on the received multimedia sequences on a per second basis. In particular, encoding device 12 may encode one-second segments of data of the plurality of input multimedia sequences, combine the encoded one-second segments of data to form a superframe of data, and transmit the superframe over transmission channel 16 via transmitter 20. As used herein, the term "superframe" refers to a group of segments of data collected over a time period or window, such as a one-second time period or window. In this case, encoding device 12 may combine the channel switch frames in the superframe with the other coded frames. In certain aspects, encoding device 12 may include a channel switch frame for each of the channels in each superframe, e.g., encode and transmit a channel switch frame every second. The techniques may also be utilized for encoding, combining and transmitting other segments of data, such as for segments of data received over a different period of time, that may or may not be a fixed period of time, or for individual frames or sets of frames of data. In other words, superframes could be defined to cover larger or smaller time intervals than one-second periods, or even variable time intervals. Note that, throughout this disclosure, a particular chunk of multimedia data (e.g., similar to the concept of a superframe) refers to any chunk of multimedia data of a particular size and/or duration, where the particular size and/or duration is based at least in part on the physical layer and/or MAC layer characteristics and/or parameters of the system used for passing on the multimedia data. Note that the particular size and/or duration can be statically and/or dynamically assigned.

The foregoing techniques may be implemented individually, or two or more of such techniques, or all of such techniques, may be implemented together in encoding device 12 and/or decoding device 14. The components in encoding device 12 and decoding device 14 are exemplary of those applicable to implement the techniques described herein. Encoding device 12 and decoding device 14, however, may include many other components, if desired. For example, encoding device 12 may include a plurality of encoding modules that each receive one or more sequences of multimedia data and encode the respective sequences of multimedia data in accordance with the techniques herein. In this case, encoding device 12 may further include at least one multiplexer to combine the segments of data for transmission. In addition, encoding device 12 and decoding device 14 may include appropriate modulation, demodulation, frequency conversion, filtering, and amplifier components for transmission and reception of encoded video, including radio frequency (RF) wireless components and antennas, as applicable. For ease of illustration, however, such components are not shown in FIG. 1.

The components in encoding device 12 and decoding device 14 may be implemented as one or more processors, digital signal processors, application specific integrated circuits (ASICs), field programmable gate arrays (FPGAs), discrete logic, software, hardware, firmware, or any combinations thereof. Depiction of different features as modules is intended to highlight different functional aspects of encoding device 12 and decoding device 14 and does not necessarily imply that such modules must be realized by separate hardware or software components. Rather, functionality associated with one or more modules may be integrated within common or separate hardware or software components. Thus, the disclosure should not be limited to the example of encoding device 12 and decoding device 14.

Figure 2:
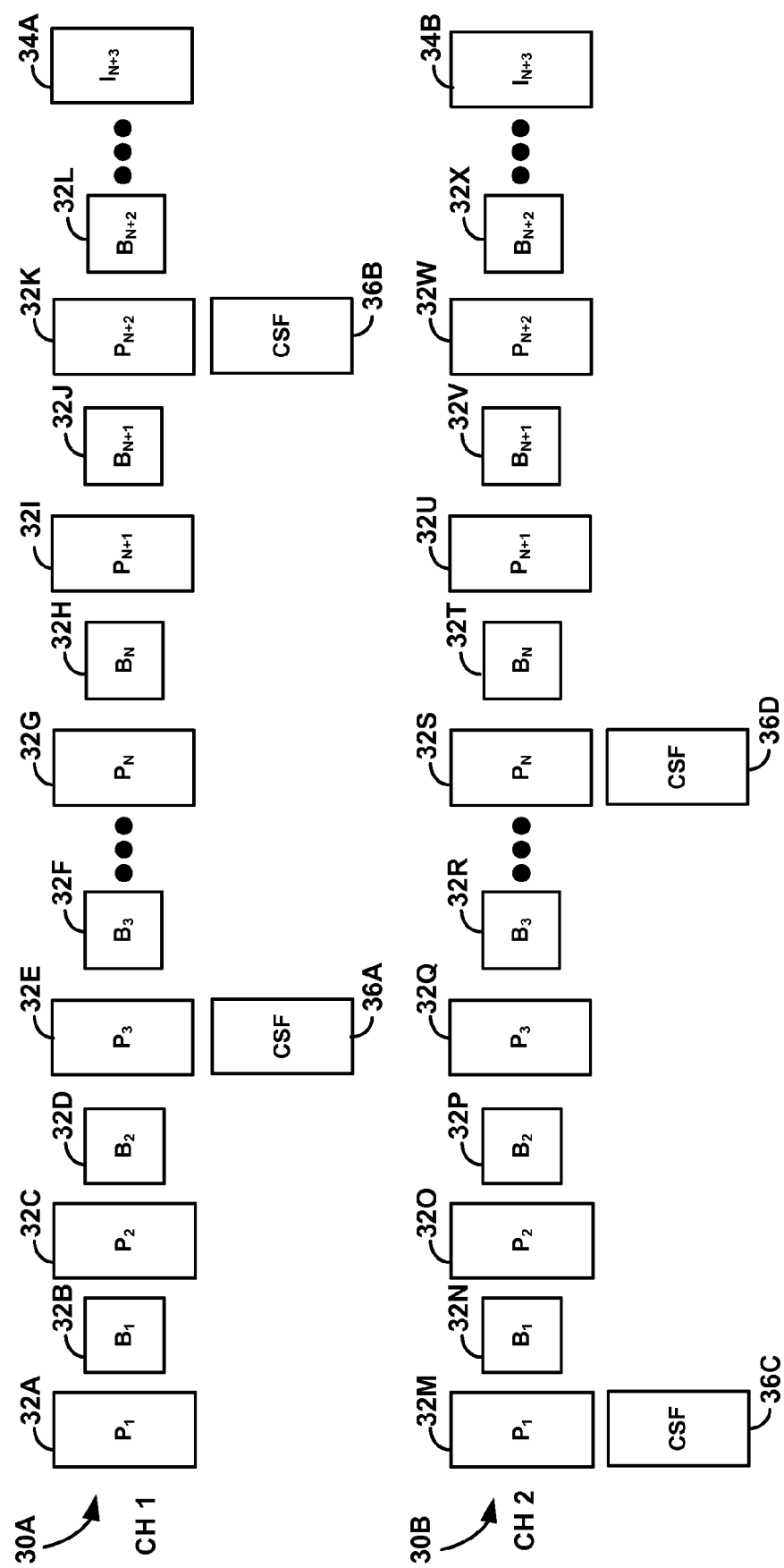
FIG. 2 is a diagram illustrating exemplary portions of encoded multimedia sequences that are coded using the techniques of this disclosure.

FIG. 2 is a diagram illustrating portions of encoded multimedia sequences 30A and 30B (collectively, "encoded sequences 30") that are coded using the techniques of this disclosure. Encoded sequence 30A corresponds to a first channel (labeled "CH. 1") and encoded sequence 30B corresponds to a second channel (labeled "CH. 2"). As an example, encoded sequence 30A may correspond to ESPN while encoded sequence 30B may correspond to CNN. Although the example illustrated in FIG. 2 illustrates encoded sequences for only two channels, the techniques of this disclosure are applicable to any number of encoded sequences for any number of channels, including one encoded sequence from one channel.

Each of encoded sequences 30 includes a plurality of coded frames. The coded frames represent compressed versions of respective input frames encoded by various inter-coding or intra-coding techniques. Encoded sequences 30 include respective ones of inter-coded frames 32A-32X (collectively, "inter-coded frames 32"), intra-coded frames 34A and 34B (collectively, "intra-coded frames 34"), and channel switch frames (CSFs) 36A-36D (collectively, "channel switch frames 36"). Inter-coded frames 32 are inter-coded versions of their respective input frames that reference one or more other frames. As illustrated in FIG. 2, inter-coded frames 32 may include P frames, B frames or a combination thereof. As described above, inter-coded frames 32 may be partitioned into a plurality of blocks, a first subset of which are coded using inter-coding techniques and a second subset of which are coded using intra-coding techniques. For example, inter-coded frame 32C (i.e., $P_2$) of encoded sequence 30A may include one or more blocks that are intra-coded in addition to the blocks that are coded using predictive coding (i.e., inter-coding). Intra-coded frames 34, on the other hand, are intra-coded versions of respective input frames that are coded without reference to other frames. Intra-coded frames 34 may, for example, occur at the start of a video sequence or at a scene change.

Encoded sequences 30 also include one or more channel switch frames 36. As described above, channel switch frames 36 comprise intra-coded multimedia data corresponding to one or more blocks of pixels of one of the inter-coded frames 32. In other words, channel switch frames 36 are second versions of at least a portion of the multimedia data coded in the corresponding one of inter-coded frames 32. In the example illustrated in FIG. 2, channel switch frame 36A comprises an intra-coded version of at least a portion of the multimedia data coded in corresponding inter-coded frame 32E. Likewise, channel switch frames 36B, 36C and 36D are intra-coded versions of at least a portion of the multimedia data coded in corresponding inter-coded frames 32K, 32M and 32S, respectively. As shown in FIG. 2, channel switch frames 36 may be temporally co-located with the corresponding one of inter-coded frames 32 in the sense that the temporal position of channel switch frame 36 within a video sequence corresponds to the temporal position of the inter-coded frame 32 in the same video sequence.

In accordance with the techniques of this disclosure, at least one of channel switch frames 36 is coded to exclude one or more blocks that can be reconstructed at a desired fidelity using a spatial error concealment algorithm. In particular, encoding device 12 (FIG. 1) identifies one or more blocks of channel switch frames 36 that may be reconstructed at the desired fidelity by decoding device 14 (FIG. 1) using one or more spatial error concealment algorithms. Encoding device 12 encodes channel switch frames 36 to exclude at least a portion of the identified blocks. Encoding channel switch frames 36 to exclude blocks that can be reconstructed using spatial error concealment may reduce the amount of bandwidth necessary to code channel switch frames 36. Encoding device 12 may use the extra bandwidth to enhance the quality of the blocks coded in channel switch frames 36 or other ones of the coded frames, or simply to reduce the amount of bandwidth utilized to code channel switch frames 32.

To further reduce the amount of bandwidth used to code channel switch frames 36, encoding device 12 may be configured to code channel switch frames 36 to exclude blocks that correspond to intra-coded blocks of the corresponding inter-coded frames 32. As an example, if inter-coded frame 32E includes one or more intra-coded blocks, encoding device 12 may code channel switch frame 36A to exclude at least a portion of the intra-coded blocks of inter-coded frame 32E.

On the decoding side, decoding device 14 receives encoded sequences 30 and decodes encoded sequences 30 as described below. For purposes of illustration, it is assumed that decoding device is currently set to channel 1 (CH 1) and thus decodes encoded sequence 30A. Decoding device 14 decodes encoded sequence 30A as if none of channel switch frames 36 are received until an event occurs which causes decoding device 14 to decode one of channel switch frames 36 in place of the corresponding one of inter-coded frames 32. The event may be, for example, a request to switch channels, e.g., from CH 1 to CH 2. In this case, decoding device 14 decodes channel switch frames 36 instead of the corresponding one of inter-coded frames 32 for initial acquisition of content of the new channel. Alternatively, decoding device 14 may decode a portion of the corresponding inter-coded frame in addition to decoding the channel switch frame, e.g., to supplement the decoded date of the channel switch frame 36. This allows decoding device 14 to render the content of the new channel from the channel switch frame 36 instead of waiting for intra-coded frame 34 or only decoding one of inter-coded frames 32, which would produce a decoded frame that is distorted with a mix of content from the previous channel and the new channel. As an example, if decoding device 14 received a request to switch from channel 1 (CH 1) to channel 2 (CH 2) at inter-coded frame 32F, the decoding device would identify the switch request and decode channel switch frame 36D in response to the request. As described above, decoding device 14 may additionally decode a portion of inter-coded frame 32S. For example, decoding device 14 may additional decode at least a portion of the intra-coded blocks of inter-coded frame 32S in addition to channel switch frame 34D. In this manner, decoding device 14 decodes channel switch frame 36D in response to the event.

Channel switch frames 36 may be used for purposes other than channel switching, e.g., to stop error propagation, enable resynchronization, or permit fast forward and rewind. In particular, the event that causes decoding device 14 to decode one of channel switch frames 36 in place of the corresponding one of inter-coded frames 32 may be detection of coded data corrupting errors that are beyond concealment capabilities. In other words, the coded data corrupting errors result in blocks reconstructed using error concealment having a fidelity that is below the desired fidelity. For example, errors may be introduced during transmission across a network. Such errors may hinder or render impossible the decoding of inter-coded frames 32. In this case, decoding device 14 decodes one of the channel switch frames 36 to stop error propagation. As described above, decoding device 14 may decode only the channel switch frame 36 or may decode a portion of the corresponding ones of inter-coded frame 32 in addition to the channel switch frame 36. For example, if decoding device 14 detects a large extent coded data corruption during decoding of any of frames 32A-32D, decoding device 14 may decode channel switch frame 36A to stop propagation of the error throughout the entire sequence. Without decoding channel switch frames 36A, the error may propagate throughout the entire sequence until an intra-coded frame is encountered, e.g., until intra frame 34A. In this manner, decoding device 14 may be viewed as forcing an intra refresh using channel switch frames 36 to cause resynchronization of the existing multimedia sequence that was disrupted by erroneously received reference data.

Decoding device 14 further reconstructs one or more blocks of channel switch frames 36 that were not coded using one or more spatial error concealment algorithms. In particular, decoding device 14 reconstructs the blocks using spatial error concealment based on the one or more decoded blocks of the channel switch frames 36. In some aspects, decoding device 14 augments the intra-coded blocks to the channel switch frames 36 with intra-coded blocks of the corresponding one of inter-coded frames 32. Thus, channel switch frames 36 may be viewed as including a combination of intra-coded blocks, some of which may be coded within the corresponding one of inter-coded frames 32. In this case, decoding device 14 may use the intra-coded blocks of channel switch frames 36 and the corresponding one of inter-coded frames 32 to reconstruct the blocks that were not coded in either of the frames.

Moreover, decoding device 14 decodes inter-coded frames 32 following channel switch frames 36 without reference to any of the coded frames preceding channel switch frames 36. Referring back to the channel switch example above, decoding device 14 decodes inter-coded frame 32U without reference to any of the coded frames preceding channel switch frame 36D. If, for example, inter-coded frame 32U referenced frame 32Q and 32S, decoding device 14 decodes inter-coded frame 32U without reference to frame 32Q. In other words, all forward dependencies of subsequent inter-coded frames 32 to any frames before channel switch frames 36 are removed to further prevent distortion due to mixing of content of the previous channel and current channel. To this end, encoding device 12 may be configured to code frames following a coded channel switch frame without reference to any coded frames preceding the channel switch frame. Alternatively, decoding device 14 may be configured to not adhere to such dependencies, if they exist, by not referencing coded frames preceding the channel switch frame, thus removing such dependencies upon decoding of one of channel switch frames 36.

Encoded sequences 30 are illustrated for exemplary purposes only. Various methods of choosing a location of channel switch frames within encoded sequences 30 may be used. Moreover, encoded sequences 30 may include different arrangements of more or less inter-coded frames 32 between channel switch frames 36. The example illustrated in FIG. 2 depicts channel switch frames 36 as comprising an entire frame without the blocks determined to be able to be reconstructed at decoding device via spatial error concealment. However, it should be noted, that the techniques of this disclosure may be utilized in other examples where only a portion of the channel switch frame, e.g., a slice, is coded as a second version of the data of the corresponding inter-coded frame. Such techniques are described later.

Figure 3:
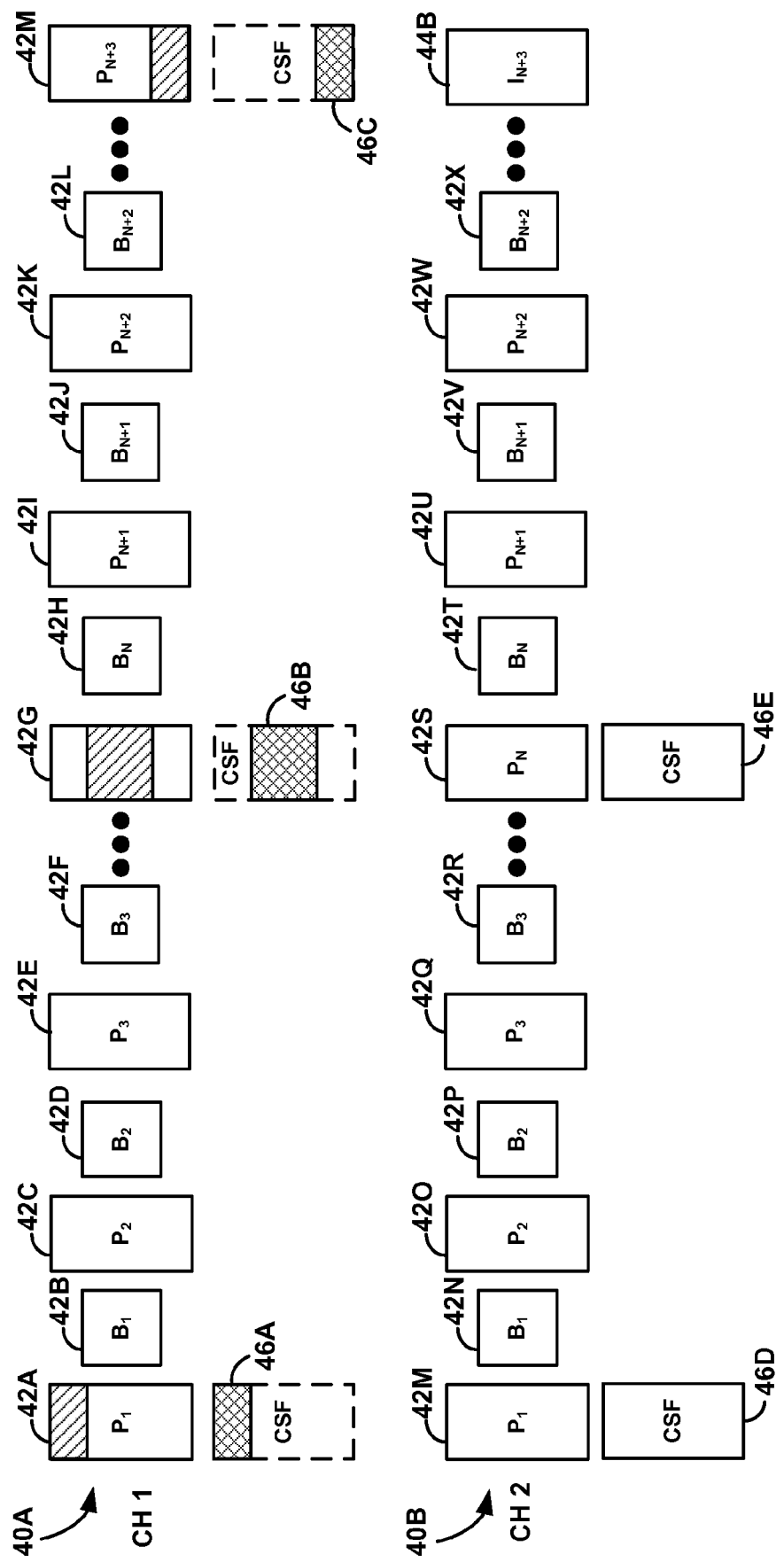
FIG. 3 is a diagram illustrating exemplary portions of encoded multimedia sequences encoded using the techniques of this disclosure.

FIG. 3 is a diagram illustrating portions of encoded multimedia sequences 40A and 40B (collectively, "encoded multimedia sequences 40") encoded using the techniques of this disclosure. Encoded multimedia sequences 40 conform substantially to encoded multimedia sequences 30 of FIG. 2, but channel switch frames 46A-46C are coded to include only a portion of the data of the corresponding inter-coded frame. More specifically, channel switch frames 46A-46C code a second version of only a slice of the multimedia data of the corresponding one of inter-coded frames 42.

In the example illustrated in FIG. 3, channel switch frames 46A-46C comprise coded slices of the corresponding one of inter-coded frames 42. In other words, channel switch frames 46A-46C code only the shaded portions of the respective inter-coded frames. For example, channel switch frame 46A codes a second version of only a respective slice of corresponding inter-coded frame 42A. Likewise, the portions of channel switch frames 46B and 46C code a second version of only respective slices of corresponding inter-coded frame 42G and 42M, respectively. In accordance with the techniques of this disclosure, encoding device 12 may encode the channel switch frame to exclude one or more blocks of the slice that can be reconstructed at a desired fidelity by decoding device 14 using one or more spatial error concealment algorithms.

On the decoding side, decoding device 14 decodes channel switch frames 46 in response to an event, e.g., a channel switch request, decoding error, or loss of data. However, because each of channel switch frames 46A-46C only code a slice of the corresponding inter-coded frames, decoding device 14 may decode each of channel switch frames 46A-46C to initially acquire the content of a new channel or perform a forced intra refresh. In particular, decoding of channel switch frame 46A results in partial acquisition of the content of the new channel. Decoding of channel switch frame 46B results in further acquisition of another portion of the content of the new channel and decoding of channel switch frame 46C results in further acquisition of another portion of the content of the new channel. After decoding all of channel switch frames 46A-46C, the entire content of the new channel is obtained.

Although decoding device 14 takes more time to initially acquire the content of the new channel or intra refresh an existing channel when channel switch frames only code a portion (e.g., slice) of the multimedia data of the corresponding inter-coded frame 32, the number of bits needed to code the channel switch frame is smaller than the number of bits required to code a channel switch frame that includes the entire content of the corresponding inter-coded frame. Thus, intra-coding channel switch that comprise only slices of data of the corresponding inter-coded frames may be better suited for particular encoding and decoding systems.

The example illustrated in FIG. 3 is for exemplary purposes only. Various methods of coding channel switch frames 46 within encoded sequences 40 may be used. For example, the coded portions of channel switch frames 46 may comprise different types of slices, such as checker board slices or other slice arrangements. Moreover, the coded portions of channel switch frames 46 may comprise coding units other than slices. For example, the coding units may comprise groups of blocks that form a coding unit smaller than a slice. Alternatively, the coding units may comprise groups of pixels that form a coding unit larger than one slice of multimedia data.

Figure 4:
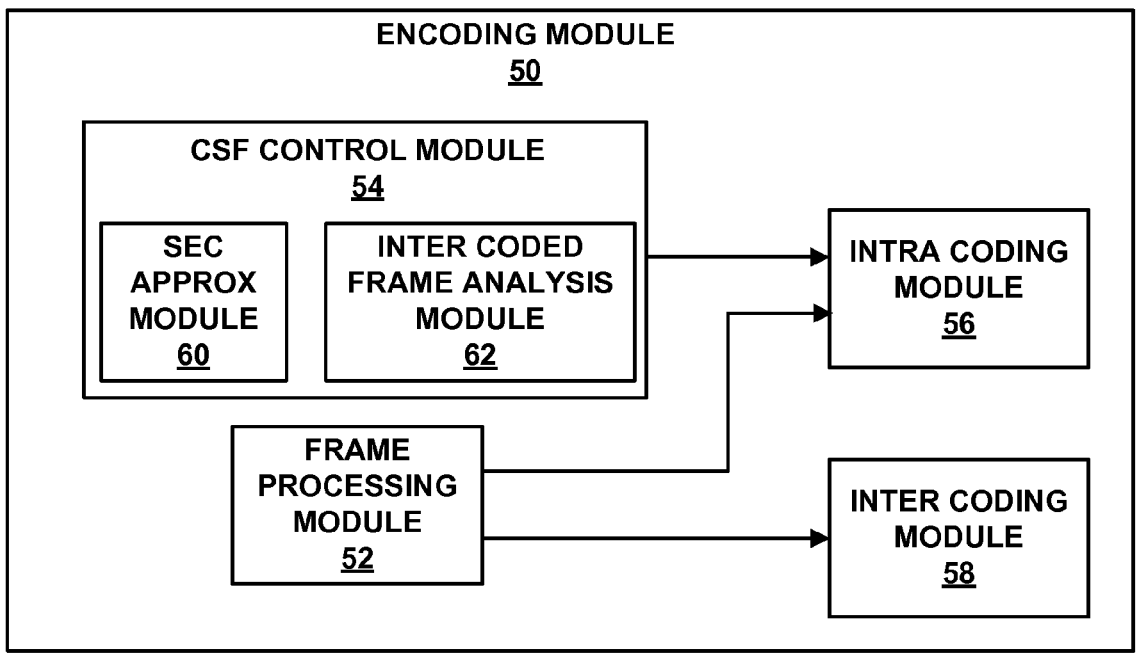
FIG. 4 is a block diagram illustrating an exemplary encoding module in further detail.

FIG. 4 is a block diagram illustrating an encoding module 50 in further detail. Encoding module 50 may, for example, represent encoding module 18 of encoding device 12 of FIG. 1. Encoding module 50 includes a frame processing module 52, a channel switch frame (CSF) control module 54, an intra-coding module 56 and an inter-coding module 58. CSF control module 54 further includes a spatial error concealment (SEC) approximation module 60 and an inter-coded frame analysis module 62.

Frame processing module 52 receives input frames of multimedia data of one or more multimedia sequences from one or more sources, and processes the frames of the received multimedia sequences. In particular, frame processing module 52 analyzes the incoming frames of the multimedia sequences and determines whether to encode or skip the incoming frames based on analysis of the incoming frames. In some aspects, encoding device 12 may encode the information contained in the multimedia sequences at a reduced frame rate using frame skipping to conserve bandwidth across transmission channel 16. Moreover, for the incoming frames that will be encoded, frame processing module 52 may also be configured to determine whether to encode the frames as I frames, P frames, or B frames.

Frame processing module 52 may be further configured to partition a frame into a plurality of blocks and determine whether to encode or skip each of the blocks separately.

Additionally, for the blocks to be encoded, frame processing module 52 may be configured to determine whether to encode the blocks as intra-coded blocks or inter-coded blocks. Frame processing module 52 may, for example, make the determination of whether to encode or skip a frame and/or block of pixels, as well as how to encode the frame and/or block of pixels, based on the content of the frame or block of pixels and possibly the content of one or more adjacent frames and one or more adjacent blocks within the frame.

Intra-coding module 56 codes the frames or blocks selected by frame processing module 52 as intra-coded frames or blocks using intra-coding. As described above, intra-coding module 56 codes the information selected for intra-coding without reference to other temporally located frames. In some aspects, intra-coding module 56 may use spatial prediction to take advantage of redundancy in the other blocks within the same temporal frame. Inter-coding module 58 codes the frames or blocks selected by frame processing module 52 as inter-coded frames or blocks. Inter-coding module 58 may, for example, use prediction techniques such as motion estimation and motion compensation to encode the frames of data with reference to one or more temporally located frames. For inter-coded frames of data that are to be coded with a first subset of the blocks coded as inter-coded blocks and a second subset of the blocks coded as intra-coded blocks, the blocks to be intra-coded are coded using intra-coding module 56 and the blocks to be inter-coded are coded using inter-coding module 58, and then combined to form the inter-coded frame.

CSF control module 54 controls encoding of at least a portion of one or more channel switch frames to enhance channel switching capabilities of decoding device 14 (FIG. 1). The channel switch frames may code one or more slices of data or other coding data unit of the corresponding inter-coded frame of data. As described above, the channel switch frames include one or more intra-coded blocks that include multimedia data of a corresponding inter-coded frame of data, e.g., a collocated inter-coded frame. In other words, the channel switch frames comprise second versions of the multimedia data coded in the corresponding inter-coded frames. CSF control module 54 may cause intra-coding module 56 to intra-code a channel switch frame once per a particular unit of time. As an example, CSF control module 54 may cause intra-coding module 56 to intra-code a channel switch frame once per second, e.g., once per superframe. Alternatively, CSF control module 54 may cause intra-coding of a channel switch frame on a non-uniform basis, such as on a non-uniform signal dependent pattern.

In accordance with the techniques of this disclosure, CSF control module 54 identifies one or more blocks of the channel switch frame that may be reconstructed at a desired fidelity at decoding device 14 using one or more spatial error concealment (SEC) algorithms, and intra-coding module 56 codes the channel switch frames to exclude, i.e., skip coding of, the identified blocks. In some aspects, SEC approximation module 60 generates, for one or more of the blocks of the channel switch frame, a version of the blocks using one or more spatial error concealment algorithms. SEC approximation module 60 may, for example, generate the spatially concealed version of the blocks using one or more spatial error concealment algorithms known to be implemented by decoding device 14. SEC approximation module 60 evaluates the one or more spatially concealed blocks of the channel switch frame to determine whether reconstruction using the spatial error concealment algorithms is sufficient. For example, SEC approximation module 60 may compute a difference metric between each of the plurality of reconstructed blocks and a corresponding one of the plurality of blocks of pixels of the portion of the channel switch frame. SEC approximation module 60 identifies, as blocks that can be reconstructed with the at least one spatial error concealment algorithm, the blocks with corresponding difference metrics that are less than or equal to a threshold. SEC approximation module 60 may, for instance, compute a sum of absolute differences (SAD), a sum of squared differences (SSD), sum of absolute transformed differences (SATD), and sum of squared transformed differences (SSTD) to quantify the difference between a block reproduced by the SEC algorithm and the original block or the difference between a block reproduced by the SEC algorithm and a coded-and-decoded version of the original block.

In other aspects, SEC approximation module 60 may not be aware of the spatial error concealment algorithms supported by decoding device 14. In this case, SEC approximation module 60 may evaluate whether one or more blocks will be reconstructed using the unknown spatial error concealment algorithms based on whether the blocks may be sufficiently interpolated. As described above, SEC approximation module 60 may determine whether the blocks can be sufficiently interpolated using information within the same frame and, in particular, information available from adjacent blocks. The assessment of whether the blocks can be sufficiently interpolated may be, for example, based on a signal smoothness or directivity evaluation, thus de-coupling the evaluation from a specific SEC algorithm. For example, SEC approximation module 60 may analyze a directional structure in pixel data of the blocks and identify, as blocks that can be reconstructed at a desired fidelity with the at least one spatial error concealment algorithm, the blocks that have a consistent directional structure.

Additionally, to further reduce the amount of bandwidth used to code the channel switch frames, inter-coded frame analysis module 62 may analyze the inter-coded frames corresponding to the channel switch frames to identify intra-coded blocks of the corresponding inter-coded frame. In some aspects, intra-coding module 56 may be configured to encode the channel switch frame to exclude one or more of the blocks that correspond to the intra-coded blocks of the corresponding inter-coded frame. Decoding device 14 may then augment the intra-coded blocks of the channel switch frame with the intra-coded blocks of the inter-coded frame corresponding the to the channel switch frame. In other aspects, intra-coding module 56 may be configured to encode the blocks of the channel switch frame corresponding to the intra-coded blocks of the corresponding inter-coded frame at a reduced quality or bit rate instead of completely skipping those blocks. Decoding module 14 may decode the reduced quality intra-coded blocks of the channel switch frame and enhance the quality of those blocks using the corresponding intra-coded frames of the corresponding inter-coded frame. CSF control module 54 sends a skip command for the blocks identified as blocks to be skipped to intra-coding module 56.

The components in encoding module 50 are exemplary of those applicable to implement the techniques described herein. Encoding module 50, however, may include many other components, if desired. The components in encoding module 50 may be implemented as one or more processors, digital signal processors, application specific integrated circuits (ASICs), field programmable gate arrays (FPGAs), discrete logic, software, hardware, firmware, or any combinations thereof. Depiction of different features as modules is intended to highlight different functional aspects of encoding module 50 and does not necessarily imply that such modules must be realized by separate hardware or software components. Rather, functionality associated with one or more modules may be integrated within common or separate hardware or software components.

Figure 5:
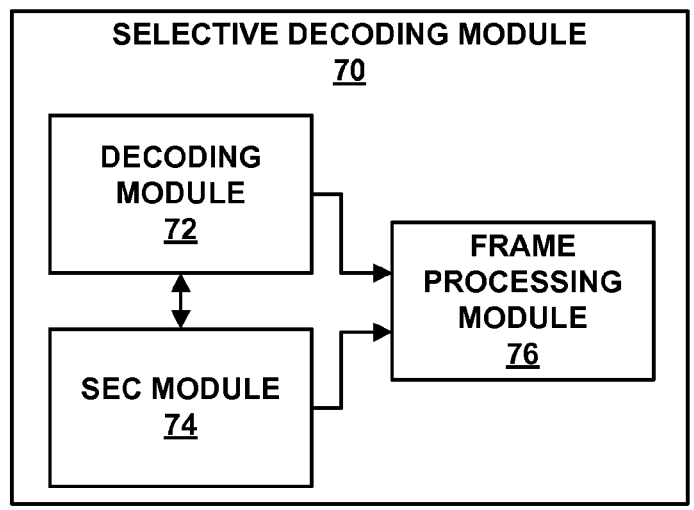
FIG. 5 is a block diagram illustrating an exemplary selective decoding module in further detail.

FIG. 5 is a block diagram illustrating an exemplary selective decoding module 70 in further detail. Selective decoding module 70 may represent selective decoding module 24 of decoding device 14 of FIG. 1. Selective decoding module 70 includes a decoding module 72, a spatial error concealment (SEC) module 74 and a frame processing module 76.

Decoding module 72 receives sequences of encoded frames and selectively decodes the frames of the sequences. The encoded sequences of frames include a plurality of inter and/or intra-coded frames as well as at least a portion of one or more channel switch frames corresponding to respective ones of the inter-coded frames. Decoding module 72 decodes the encoded sequences of frames as if no channel switch frames are received until an event occurs which causes decoding module 72 to decode the portion of one of the channel switch frames in place of the corresponding one of the inter-coded frames. In some aspects, the event may be a request to switch channels.

In response to the request, decoding module 72 decodes the portion of the channel switch frame associated with the new channel in place of the corresponding one of the inter-coded frames to initially acquire content of the new channel. Decoding the portion of the channel switch frame may provide a number of advantages. First, it permits rendering of the content of the new channel from the channel switch frame instead of waiting for intra-coded frame, which may not be received in an adequate amount of time. Secondly, it permits decoding of a frame that is not dependent on content of previous frames which, in the case of a channel switch, would result in a decoded frame that is distorted with a mix of content from the previous channel and the new channel.

Alternatively, the event may be detection of corruption of one or more frames that is a result of errors introduced during transmission or loss of data during transmission across a network. In this case, decoding module 72 decodes the portion of one or more channel switch frames instead of the corresponding one of the inter-coded frames to reduce error propagation. In this manner, decoding module 72 may be viewed as forcing an intra refresh using the portions of one or more channel switch frames to cause resynchronization of the existing multimedia sequence that was disrupted by erroneously received or lost reference data.

Decoding module 72 may further decode intra-coded blocks of the inter-coded frame corresponding to the portion of the channel switch frame to supplement the decoded portion of the channel switch frame. In some aspects, decoding module 72 may augment the intra-coded blocks of the portion of the channel switch frame with the intra-coded blocks of the inter-coded frame corresponding the to the channel switch frame. In this manner, decoding module 72 decodes both the CSF and one or more intra-coded blocks of the inter-coded frame corresponding to the CSF, and treats the intra-coded blocks of the corresponding inter-coded frame as if they were part of the channel switch frame. In other aspects, decoding module 72 may enhance the quality of the intra-coded blocks of the portion of the channel switch frame using the corresponding intra-coded frames of the corresponding inter-coded frame.

SEC module 74 reconstructs one or more blocks of the channel switch frame using one or more spatial error concealment algorithms. In particular, SEC module 74 reconstructs the blocks that were skipped by encoding module 18 because of the determination that those blocks can be reconstructed at a desired fidelity at decoding device 14. SEC module 74 may reconstruct the skipped blocks based on one or more decoded blocks of the portion of the channel switch frame, which may include intra-coded blocks coded in the portion of the channel switch frame as well as the intra-coded blocks of the corresponding inter-coded frame that are used to augment the intra-coded blocks of the portion of the channel switch frame.

Frame processing module 76 combines intra-coded blocks of the channel switch frame decoded by decoding module 72 and blocks reconstructed by SEC module 74 to generate a decoded frame of data. Again, the decoded blocks of the channel switch frame may include intra-coded blocks coded in the portion of the channel switch frame as well as the intra-coded blocks of the corresponding inter-coded frame that are used to augment the intra-coded blocks of the portion of the channel switch frame. The frame of data generated by frame processing module 76 may be presented to a user via a display that is either integrated within decoding device 14 or provided as a discrete device coupled to decoding device 14 via a wired or wireless connection.

The components in selective decoding module 70 are exemplary of those applicable to implement the techniques described herein. Selective decoding module 70, however, may include many other components, if desired. The components in selective decoding module 70 may be implemented as one or more processors, digital signal processors, application specific integrated circuits (ASICs), field programmable gate arrays (FPGAs), discrete logic, software, hardware, firmware, or any combinations thereof. Depiction of different features as modules is intended to highlight different functional aspects of selective decoding module 70 and does not necessarily imply that such modules must be realized by separate hardware or software components. Rather, functionality associated with one or more modules may be integrated within common or separate hardware or software components.

Figure 6:
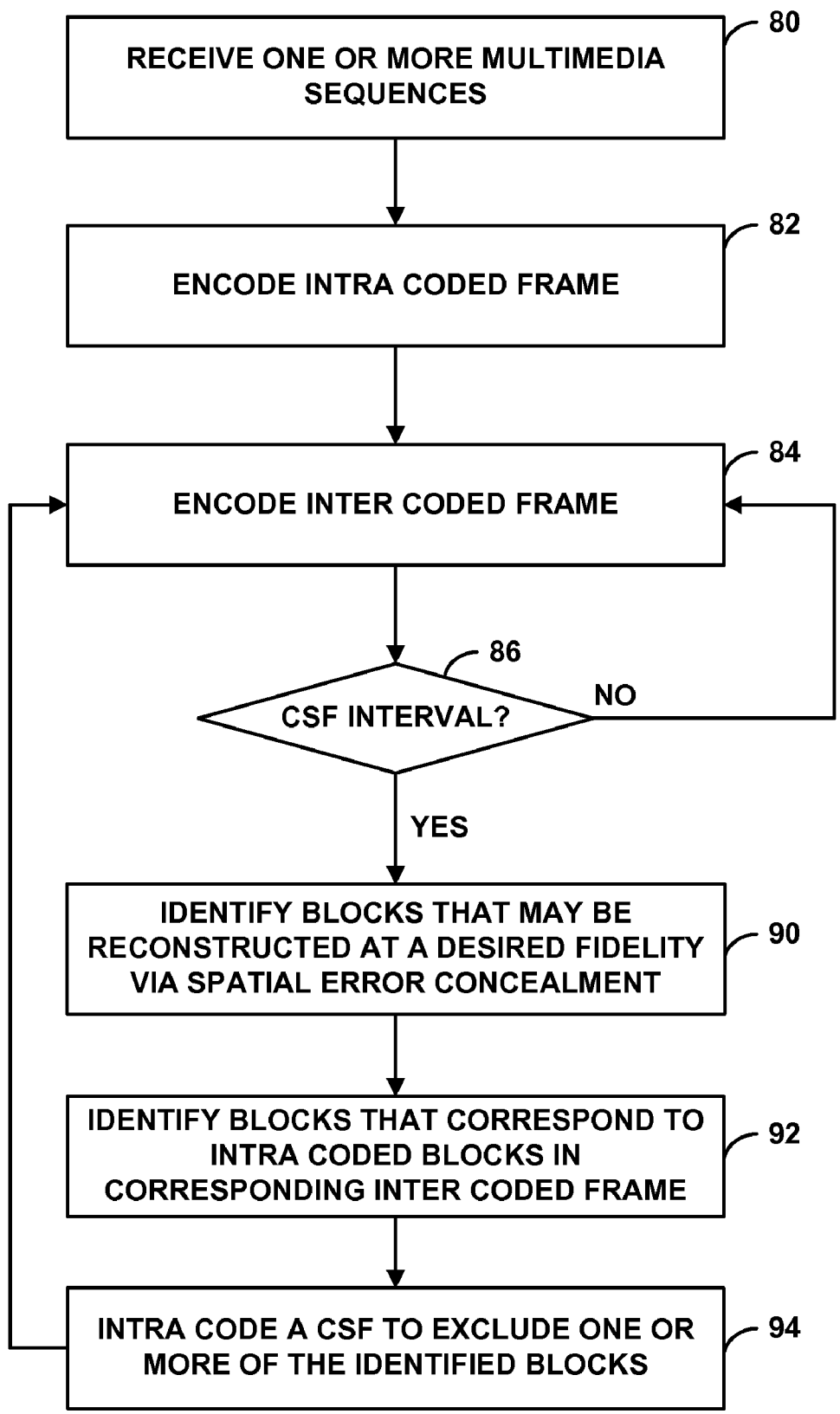
FIG. 6 is a flow diagram illustrating exemplary operation of an encoding module encoding sequences of multimedia data in accordance with the techniques of this disclosure.

FIG. 6 is a flow diagram illustrating exemplary operation of an encoding module encoding sequences of multimedia data in accordance with the techniques of this disclosure. Initially, frame processing module 52 (FIG. 4) receives multimedia sequences that includes input frames of multimedia data (80). Encoding device 12 (FIG. 1) encodes an intra frame as the first frame of the multimedia sequence (82). In particular, intra-coding module 56 (FIG. 4) intra-codes the first frame of the multimedia sequence using intra-coding techniques. Encoding device 12 inter-codes the next frame of the multimedia sequence (84). The frame of data may be partitioned into a plurality of blocks, and encoding device 12 may inter-code all of the blocks of the next frame using inter-coding module 58 (FIG. 4). Alternatively, a first subset of the blocks may be inter-coded via inter-coding module 58 and a second subset of the blocks may be intra-coded using intra-coding module 56.

CSF control module 54 (FIG. 4) determines whether a channel switch frame (CSF) interval has expired (86). As described above, encoding device 12 may be configured to encode and transmit a channel switch frame on a periodic basis, e.g., once per second. In this case, CSF control module 54 may track the amount of time since the last channel switch frame was sent. When the channel switch frame interval has not expired, encoding device 12 encodes another inter-coded frame (84). In some cases, as in the case when an intra refresh is need or at a scene change, encoding device 12 may encode the next frame as an intra-coded frame.

When the channel switch frame interval has expired, SEC approximation module 60 identifies one or more blocks of the inter-coded frame that may be reconstructed at a desired fidelity at decoding device 14 using one or more spatial error concealment algorithms (90). If SEC approximation module 60 is aware of the spatial error concealment algorithms used by decoding device 14, SEC approximation module 60 may generate the spatially concealed version of the blocks using one or more spatial error concealment algorithms of decoding device 14. SEC approximation module 60 may compute a difference metric between each of the plurality of reconstructed blocks and a corresponding one of the plurality of blocks pixels of the corresponding inter-coded frame. On this basis, SEC approximation module 60 may identify, as blocks that can be reconstructed with the at least one spatial error concealment algorithm, the blocks with corresponding difference metrics that are less than or equal to a threshold. If SEC approximation module 60 is not aware of the spatial error concealment algorithms supported by decoding device 14, SEC approximation module 60 may evaluate whether one or more blocks will be reconstructed at the desired fidelity using spatial error concealment based on the likelihood that the blocks may be sufficiently interpolated. The assessment of whether the blocks can be sufficiently interpolated may be, for example, based on a signal smoothness or directivity evaluation.

Additionally, inter-coded frame analysis module 62 may also identify the blocks that correspond to intra-coded blocks coded in the corresponding inter-coded frame (92). Encoding module 18 encodes at least a portion of a channel switch frame to exclude one or more of the identified blocks (94). In particular, encoding module 18 intra-codes the blocks of pixels that cannot be readily reproduced using spatial error concealment. Encoding module, however, skips intra-coding of the blocks of pixels that can be reconstructed at desired fidelity using spatial error concealment. In this manner, encoding module 18 encodes the channel switch frame to exclude at least one of the blocks that were identified as being capable of being reconstructed using spatial error concealment algorithms. In some aspects, encoding module 18 may additionally encode the portion of the channel switch frame to exclude at least one of the blocks of the channel switch frame that correspond to the intra-coded blocks of the corresponding inter-coded frame. Alternatively, encoding module 18 may encode the blocks of the portion of the channel switch frame that correspond to the intra-coded blocks of the corresponding inter-coded frame at a reduced quality or bit rate instead of completely skipping those blocks.

After encoding the channel switch frame, encoding module 18 encodes a subsequent inter-coded frame (84). Encoding module 18 may encode the subsequent inter-coded frame such that the inter-coded frame does not have any forward references to frames preceding the channel switch frame. Instead encoding module 18 may encode the subsequent inter-coded frame with reference the channel switch frame or the inter-coded frame corresponding to the channel switch frame.

Figure 7:
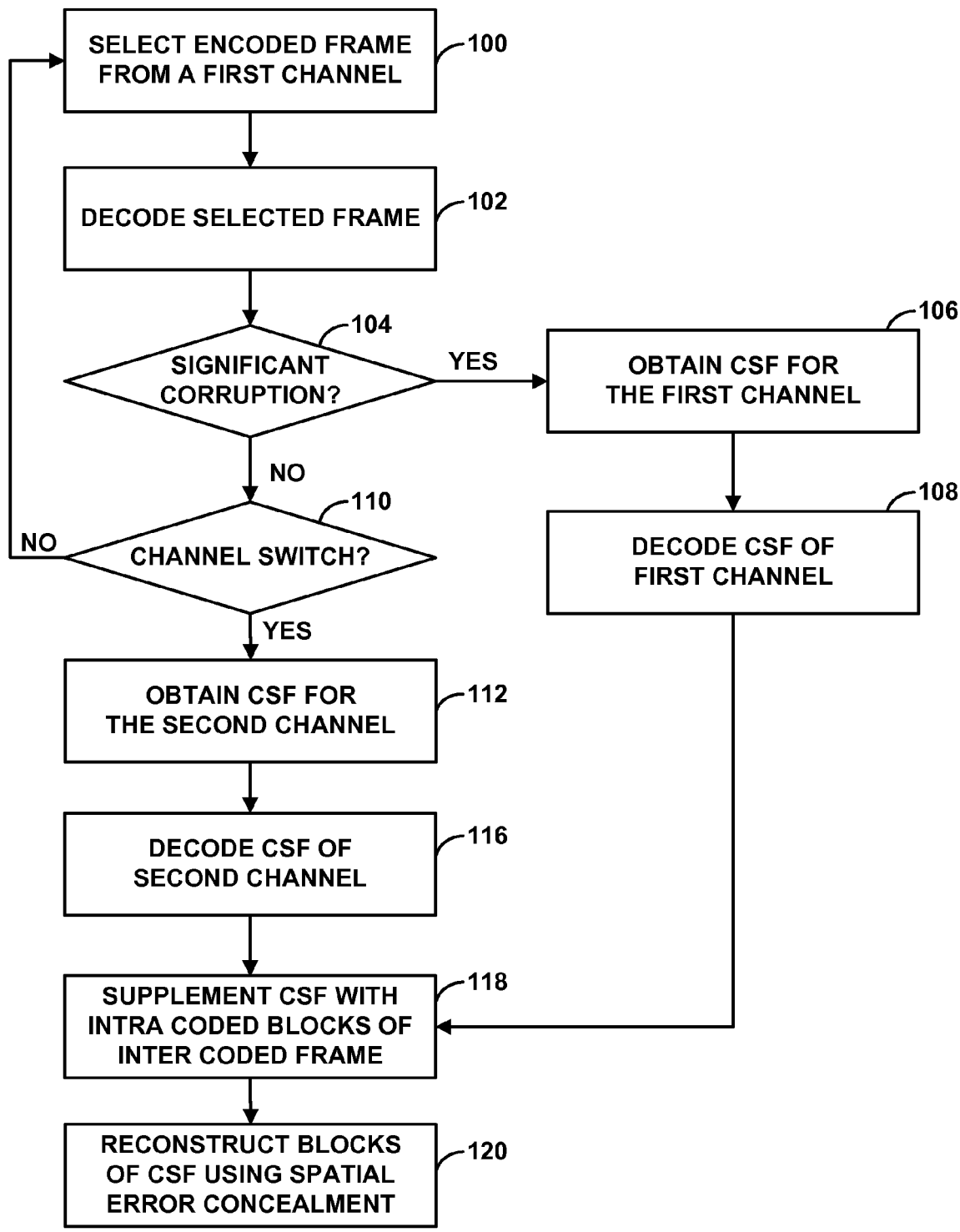
FIG. 7 is flow diagram illustrating exemplary operation of a selective decoding module decoding encoded multimedia sequences of data in accordance with the techniques of this disclosure.

FIG. 7 is flow diagram illustrating exemplary operation of a selective decoding module, such as selective decoding module 24 of FIG. 1, decoding encoded multimedia sequences of data in accordance with the techniques of this disclosure. Selective decoding module 24 selects an encoded frame from a first channel (100) and decodes the selected frame (102). Selective decoding module 24 determines whether there is significant corruption in the decoded frame (104). Decoding module 24 may determine that the corruption is significant when the block is reconstructed at a fidelity that is less than a desired fidelity. The corruption may, for example, be a result of errors introduced during transmission or loss of data during transmission of the data across a network. Depending on the underlying transport mechanism, significant corruption could be determined based on different metrics. In certain aspects, selective decoding module 24 maintains one or more counters that indicate the number of Physical Layer Packets (PLPs) of the current encoded video frame that are corrupt, i.e., unrecoverable. In other aspects, a bit of a Network Abstraction Layer Unit (NALU) header, e.g., a 'Forbidden_Zero_Bit,' may mark the NALU as carrying no bit errors if it is 0, or as being corrupt with bit errors if it is set to 1. Selective decoding module 24 may compare the amount of coded data of the current video frame that is corrupt, i.e., the number of Forbidden Zero Bits set to 1 with a threshold as an indicator of significant corruption. The threshold may be dependent on the frame coding type, e.g., selective decoding module 24 may allow a B frame to be 100% corrupt without resorting to the next instance of a CSF for error handling purposes, while a frame used as a temporal reference for other frames may have a threshold of 30%.

When selective decoding module 24 determines that there is significant corruption in the decoded frame, selective decoding module 24 obtains a channel switch frame for the first channel (106). For example, selective decoding module 24 may obtain the channel switch frame that corresponds with one of the subsequent inter-coded frames. Selective decoding module 24 decodes the portion of the channel switch frame for the first channel (108). In this manner, selective decoding module 24 decodes the portion of the channel switch frame in the place of the corresponding inter-coded frame.

When selective decoding module 24 determines that there is no significant corruption in the decoded frame, selective decoding module 24 determines whether there has been a request for a channel switch (110). When there is not a request for a channel switch, selective decoding module 24 selects the next encoded frame and decodes the selected frame (100). When selective decoding module 24 determines there is a request for a channel switch, selective decoding module 24 obtains a channel switch frame for the second channel (112). More specifically, selective decoding module 24 obtains the channel switch frame that corresponds with one of the subsequent inter-coded frames for the second channel. Selective decoding module 24 decodes the channel switch frame for the second channel in place of the corresponding inter-coded frame (116).

After decoding the channel switch frame, selective decoding module 24 may further decode intra-coded blocks of the inter-coded frame corresponding to the portion of the channel switch frame to supplement the decoded portion of the channel switch frame (118). In some aspects, selective decoding module 24 may augment the intra-coded blocks of the channel switch frame with the intra-coded blocks of the inter-coded frame corresponding the to the channel switch frame. In this manner, selective decoding module 24 treats the intra-coded blocks of the corresponding inter-coded frame as if they were part of the channel switch frame. In other aspects, selective decoding module 24 may enhance the quality of the intra-coded blocks of the channel switch frame using the corresponding intra-coded frames of the corresponding inter-coded frame.

Selective decoding module 24 reconstructs one or more blocks of the channel switch frame using one or more spatial error concealment algorithms (120). In particular, selective decoding module 24 reconstructs the blocks that were skipped by encoding module 18 because of the determination that those blocks can be reconstructed at decoding device 14. Selective decoding module 24 may reconstruct the skipped blocks based on one or more decoded blocks of the channel switch frame, which may include intra-coded blocks coded in the channel switch frame as well as the intra-coded blocks of the corresponding inter-coded frame that are used to augment the intra-coded blocks of the channel switch frame.

Figure 8:
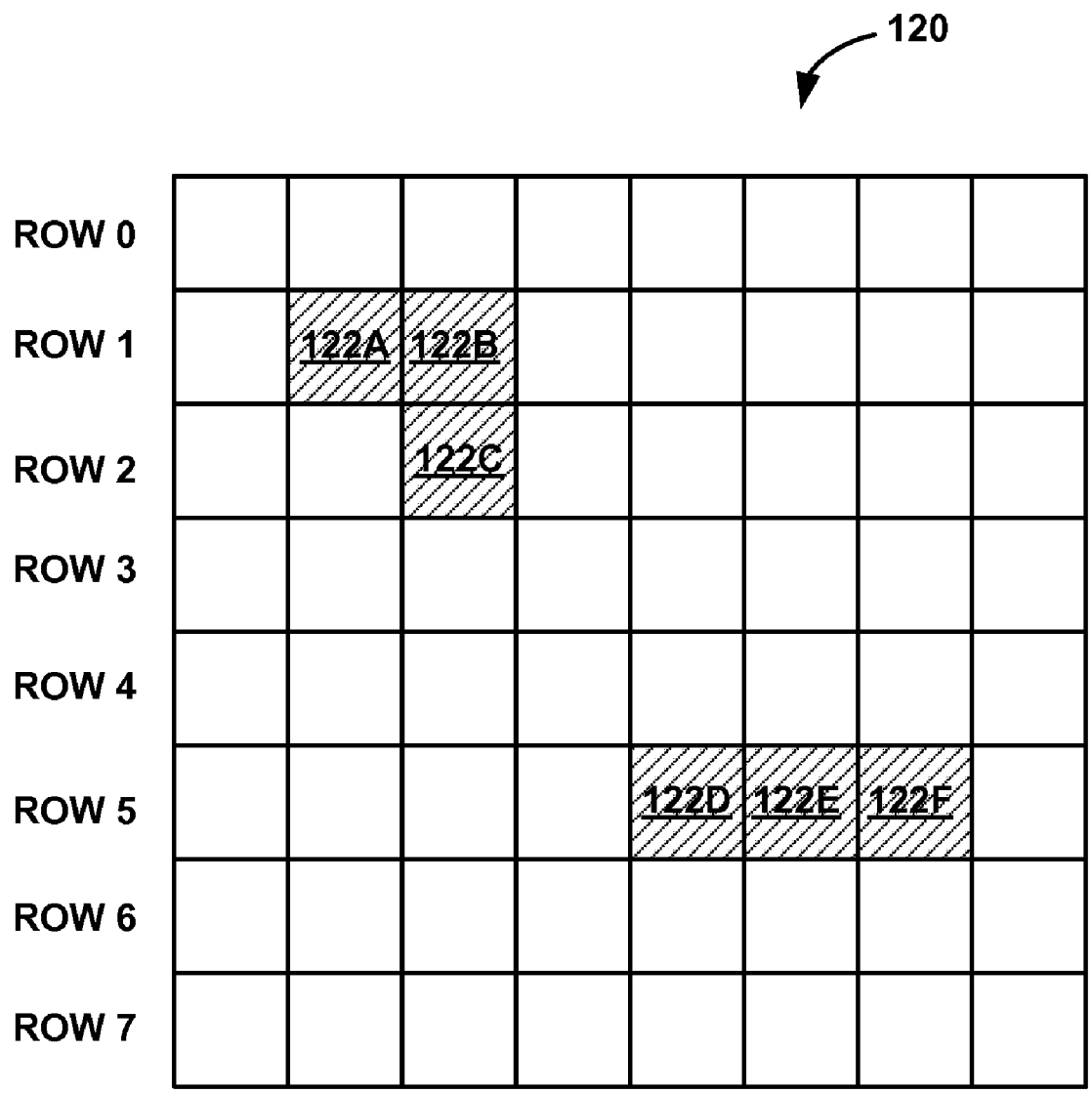
FIG. 8 illustrates an exemplary channel switch frame encoded in accordance with the techniques of this disclosure.

FIG. 8 illustrates an exemplary channel switch frame 120 encoded in accordance with the techniques of this disclosure. In particular, channel switch frame 120 is coded to exclude one or more blocks that can be reconstructed at a desired fidelity from one or more coded blocks of channel switch frame 120 using one or more spatial error concealment algorithms. In the example illustrated in FIG. 8, channel switch frame 120 is coded to exclude the shaded blocks 122A-122F. In the example of FIG. 8, channel switch frame 120 comprises an 8×8 block of pixel blocks. However, the techniques are applicable to channel switch frames of other sizes. Moreover, although channel switch frame 120 of FIG. 8 comprises an entire fame, the techniques may be applied to code a channel switch frame that comprises an intra-coded version of a slice of the corresponding inter-coded frame. For example, the channel switch frame may be coded to comprise a slice of the inter-coded frame that includes only the first two rows of blocks, i.e., ROWS 0 and 1, intra-coded to exclude shaded blocks 122A and 122B.

Figure 9:
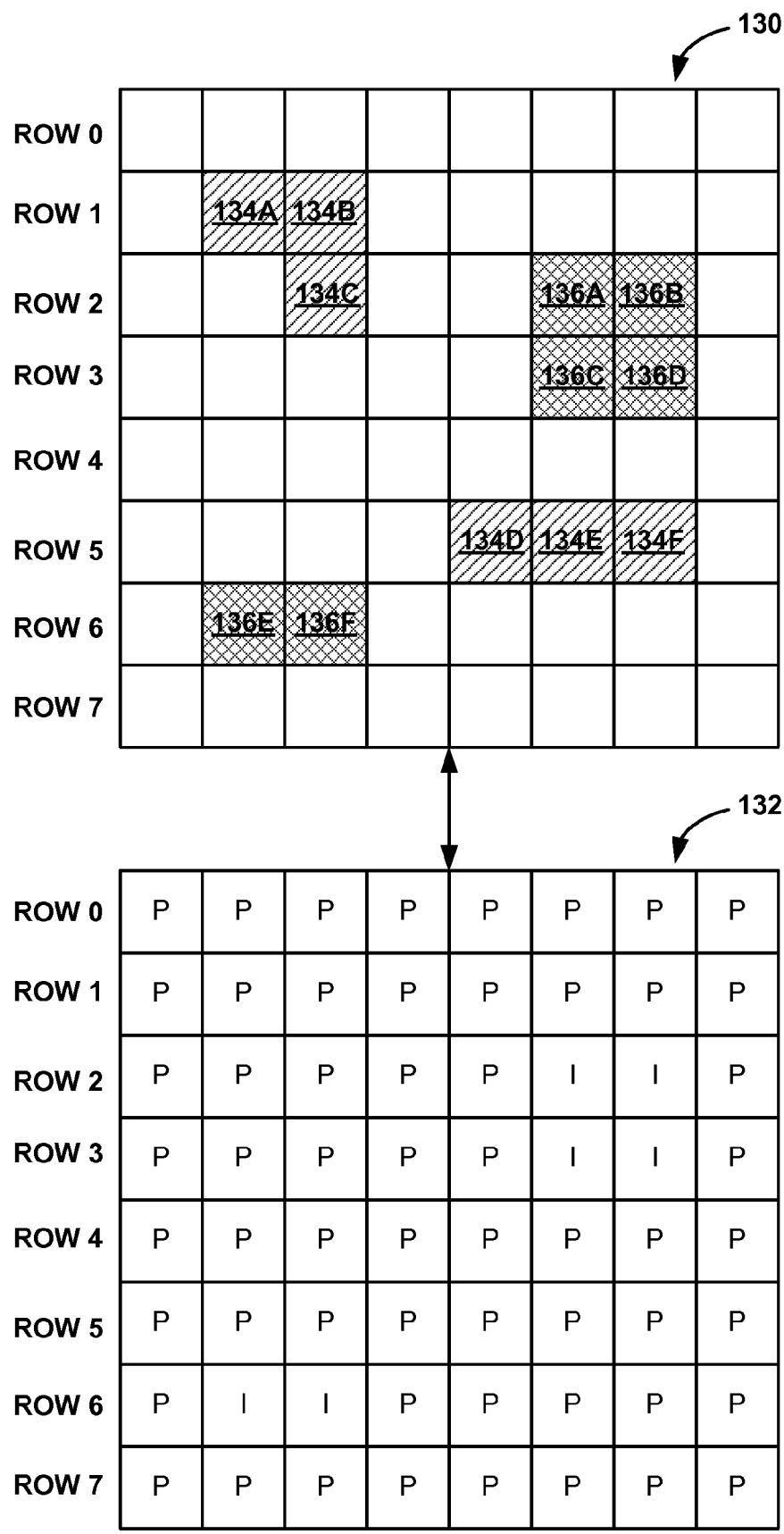
FIG. 9 illustrates another exemplary channel switch frame encoded in accordance with the techniques of this disclosure in conjunction with a corresponding inter-coded frame.

FIG. 9 illustrates another exemplary channel switch frame 130 encoded in accordance with the techniques of this disclosure in conjunction with a corresponding inter-coded frame 132. Channel switch frame 130, like channel switch frame 120 of FIG. 8, is coded to exclude one or more blocks that can be reconstructed from one or more of the coded blocks using one or more spatial error concealment algorithms. Channel switch frame 130, however, is also coded to exclude blocks that correspond to intra-coded blocks of corresponding inter-coded frame 132 (i.e., the blocks labeled "I" in FIG. 9). Channel switch frame 130 of FIG. 9 comprises an 8×8 block of pixel blocks. However, the techniques are applicable to channel switch frames of other sizes. Moreover, the techniques may be applied to code a channel switch frame that comprises an intra-coded version of a slice of the corresponding inter-coded frame. For example, the channel switch frame may be coded to comprise a slice of the inter-coded frame that includes rows 2-5 of blocks intra-coded to exclude shaded blocks 134C-134F as well as cross hatched blocks 136A-136D.

Based on the teachings described herein, it should be apparent that an aspect disclosed herein may be implemented independently of any other aspects and that two or more of these aspects may be combined in various ways. The techniques described herein may be implemented in hardware, software, firmware, or any combination thereof. If implemented in hardware, the techniques may be realized using digital hardware, analog hardware or a combination thereof. If implemented in software, the techniques may be realized at least in part by a computer-program product that includes a computer readable medium on which one or more instructions or code is stored.

By way of example, and not limitation, such computer-readable media can comprise RAM, such as synchronous dynamic random access memory (SDRAM), read-only memory (ROM), non-volatile random access memory (NVRAM), ROM, electrically erasable programmable read-only memory (EEPROM), erasable programmable read-only memory (EPROM), FLASH memory, CD-ROM or other optical disk storage, magnetic disk storage or other magnetic storage devices, or any other tangible medium that can be used to carry or store desired program code in the form of instructions or data structures and that can be accessed by a computer.

The instructions or code associated with a computer-readable medium of the computer program product may be executed by a computer, e.g., by one or more processors, such as one or more digital signal processors (DSPs), general purpose microprocessors, ASICs, FPGAs, or other equivalent integrated or discrete logic circuitry.

A number of aspects and examples have been described. However, various modifications to these examples are possible, and the principles presented herein may be applied to other aspects as well. These and other aspects are within the scope of the following claims.

What is claimed is:

1. A method for processing multimedia data, the method comprising:
   inter-coding a frame of multimedia data, wherein the inter-coded frame includes a plurality of blocks of pixels; and
   intra-coding a channel switch frame that comprises at least a portion of the multimedia data coded in the inter-coded frame, wherein the channel switch frame is coded to exclude one or more of the plurality of blocks of pixels of the inter-coded frame that can be reconstructed at a desired fidelity using a spatial error concealment algorithm.

2. The method of claim 1, wherein intra-coding the channel switch frame comprises intra-coding the channel switch frame to include one or more slices of the multimedia data coded in the inter-coded frame.

3. The method of claim 1, further comprising analyzing one or more of the plurality of blocks of pixels to identify the excluded blocks of pixels that can be reconstructed at the desired fidelity using the spatial error concealment algorithm.

4. The method of claim 3, wherein analyzing one or more of the plurality of blocks of pixels comprises:
   applying the spatial error concealment algorithm to reconstruct one or more of the plurality of blocks of pixels;
   computing a difference metric between each of the plurality of reconstructed blocks of pixels and a corresponding one of the plurality of blocks pixels of the inter-coded frame; and
   identifying, as the excluded blocks of pixels that can be reconstructed at the desired fidelity using the spatial error concealment algorithm, blocks of pixels with corresponding difference metrics that are less than or equal to a threshold.

5. The method of claim 4, wherein computing the difference metrics comprises computing one of a sum of absolute differences (SAD), a sum of squared differences (SSD), sum of absolute transformed differences (SATD), and sum of squared transformed differences (SSTD).

6. The method of claim 4, wherein applying the spatial error concealment algorithm comprises applying at least one spatial error concealment algorithm used by a corresponding decoding module.

7. The method of claim 3, wherein analyzing one or more of the plurality of blocks of pixels further comprises:
   analyzing information associated with one or more of the plurality of blocks of pixels to determine whether the blocks of pixels can be reconstructed at the desired fidelity using the spatial error concealment algorithm; and
   identifying, as the excluded blocks of pixels that can be reconstructed at the desired fidelity using the spatial error concealment algorithm, blocks of pixels that can be sufficiently interpolated using one or more adjacent blocks of pixels.

8. The method of claim 7, wherein:
   analyzing information associated with one or more of the plurality of blocks of pixels comprises determining a directional structure in pixel data of the blocks of pixels; and identifying, as the excluded blocks of pixels that can be reconstructed at the desired fidelity using the spatial error concealment algorithm, blocks of pixels that have a consistent directional structure.

9. The method of claim 1, wherein:
inter-coding the frame of multimedia data comprises inter-coding a first subset of the blocks of pixels of the inter-coded frame using temporal predictive coding and intra-coding a second subset of the blocks of pixels of the inter-coded frame; and
intra-coding the channel switch frame comprises intra-coding the channel switch frame to include the multimedia data corresponding to one or more of the blocks of pixels of the first subset of the blocks of pixels of the inter-coded frame without coding the multimedia data corresponding to one or more of the blocks of pixels of the second subset of the blocks of pixels of the inter-coded frame.

10. The method of claim 1, wherein:
inter-coding the frame of multimedia data comprises inter-coding a first subset of the blocks of pixels of the inter-coded frame using temporal predictive coding and intra-coding a second subset of the blocks of pixels of the inter-coded frame; and
intra-coding the channel switch frame comprises intra-coding the multimedia data corresponding to one or more of the blocks of pixels of the second subset of the blocks of pixels of the inter-coded frame at a reduced quality relative to the multimedia data included by the channel switch frame corresponding to one or more of the blocks of pixels of the first subset of the blocks of pixels of the corresponding inter-coded frame.

11. The method of claim 1, wherein the inter-coded frame and the channel switch frame comprise a first inter-coded frame and a first channel switch frame, the method further comprising:
inter-coding a second frame of multimedia data; and
intra-coding a second channel switch frame that comprises at least a portion of the multimedia data coded in the second inter-coded frame, wherein the second channel switch frame is coded to exclude one or more blocks of pixels of the second inter-coded frame that can be reconstructed at the desired fidelity using the spatial error concealment algorithm.

12. The method of claim 11, wherein the first channel switch frame codes a first slice of the multimedia data coded in the first inter-coded frame and the second channel switch frame codes a second slice of the multimedia data coded in the second inter-coded frame.

13. An apparatus for processing multimedia data, the apparatus comprising one or more processors and memory configured to implement an encoding module that:
inter-codes a frame of multimedia data, wherein the inter-coded frame includes a plurality of blocks of pixels, and
intra-codes a channel switch frame that comprises at least of a portion of the multimedia data coded in the inter-coded frame, wherein the channel switch frame is coded to exclude one or more blocks of pixels of the inter-coded frame that can be reconstructed at a desired fidelity using a spatial error concealment algorithm.

14. The apparatus of claim 13, wherein the encoding module intra-codes the channel switch frame to include a slice of the multimedia data coded in the inter-coded frame.

15. The apparatus of claim 13, wherein the encoding module analyzes one or more of the plurality of blocks of pixels to identify the excluded blocks of pixels that can be reconstructed at the desired fidelity using the spatial error concealment algorithm.

16. The apparatus of claim 15, wherein the encoding module: applies the spatial error concealment algorithm to reconstruct one or more of the plurality of blocks of pixels;
computes a difference metric between each of the plurality of reconstructed blocks of pixels and a corresponding one of the plurality of blocks pixels of the inter-coded frame; and
identifies, as the excluded blocks of pixels that can be reconstructed at the desired fidelity using the spatial error concealment algorithm, blocks of pixels with corresponding difference metrics that are less than or equal to a threshold.

17. The apparatus of claim 16, wherein the encoding module computes one of a sum of absolute differences (SAD), a sum of squared differences (SSD), sum of absolute transformed differences (SATD), and sum of squared transformed differences (SSTD).

18. The apparatus of claim 16, wherein the encoding module applies the spatial error concealment algorithm comprises applying at least one spatial error concealment algorithm used by a corresponding decoding module.

19. The apparatus of claim 15, wherein the encoding module:
analyzes information associated with one or more of the plurality of blocks of pixels to determine whether the blocks of pixels can be reconstructed at the desired fidelity using the spatial error concealment algorithm; and
identifies, as the excluded blocks of pixels that can be reconstructed at the desired fidelity using the spatial error concealment algorithm, blocks of pixels that can be sufficiently interpolated.

20. The apparatus of claim 19, wherein encoding module: analyzes information associated with one or more of the plurality of blocks of pixels comprises determining a directional structure in pixel data of the blocks of pixels; and
identifies, as the excluded blocks of pixels that can be reconstructed at the desired fidelity using the spatial error concealment algorithm, blocks of pixels that have a consistent directional structure.

21. The apparatus of claim 13, wherein the encoding module:
inter-codes a first subset of the blocks of pixels of the inter-coded frame using temporal predictive coding;
intra-codes a second subset of the blocks of pixels of the inter-coded frame; and
intra-codes the channel switch frame to include the multimedia data corresponding to one or more of the blocks of pixels of the first subset of the blocks of pixels of the inter-coded frame without coding the multimedia data corresponding to one or more of the blocks of pixels of the second subset of the blocks of pixels of the inter-coded frame.

22. The apparatus of claim 13, wherein the encoding module:
inter-codes a first subset of the blocks of pixels of the inter-coded frame using temporal predictive coding;
intra-codes a second subset of the blocks of pixels of the inter-coded frame; and
intra-codes the multimedia data corresponding to one or more of the blocks of pixels of the second subset of the blocks of pixels of the inter-coded frame at a reduced quality relative to the multimedia data included by the channel switch frame corresponding to one or more of the blocks of pixels of the first subset of the blocks of pixels of the corresponding inter-coded frame.

23. The apparatus of claim 13, wherein:
the inter-coded frame and the channel switch frame comprise a first inter-coded frame and a first channel switch frame; and
the encoding module inter-codes a second frame of multimedia data and intra-codes a second channel switch frame that comprises at least a portion of the multimedia data coded in the second inter-coded frame, wherein the second channel switch frame is coded to exclude one or more blocks of pixels of the second inter-coded frame that can be reconstructed at the desired fidelity using the spatial error concealment algorithm.

24. The apparatus of claim 13, wherein the encoding module:
intra-codes the first channel switch frame to comprise a first slice of the multimedia data coded in the first inter-coded frame; and
intra-codes the second channel switch frame to comprise a second slice of the multimedia data coded in the second inter-coded frame.

25. An apparatus for processing multimedia data, the apparatus comprising:
one or more processors and memory configured to implement:
means for inter-coding a frame of multimedia data, wherein the inter-coded frame includes a plurality of blocks of pixels; and
means for intra-coding a channel switch frame that comprises at least a portion of the multimedia data coded in the inter-coded frame, wherein the channel switch frame is coded to exclude one or more of the plurality of blocks of pixels of the inter-coded frame that can be reconstructed at a desired fidelity using a spatial error concealment algorithm.

26. The apparatus of claim 25, wherein the intra-coding means intra-codes the channel switch frame to include one or more slices of the multimedia data coded in the inter-coded frame.

27. The apparatus of claim 25, further comprising means for analyzing one or more of the plurality of blocks of pixels to identify the excluded blocks of pixels that can be reconstructed at the desired fidelity using the spatial error concealment algorithm.

28. The apparatus of claim 27, wherein the analyzing means includes:
means for applying the spatial error concealment algorithm to reconstruct one or more of the plurality of blocks of pixels;
means for computing a difference metric between each of the plurality of reconstructed blocks of pixels and a corresponding one of the plurality of blocks pixels of the inter-coded frame; and
means for identifying, as the excluded blocks of pixels that can be reconstructed at the desired fidelity using the spatial error concealment algorithm, blocks of pixels with corresponding difference metrics that are less than or equal to a threshold.

29. The apparatus of claim 28, wherein the analyzing means computes one of a sum of absolute differences (SAD), a sum of squared differences (SSD), sum of absolute transformed differences (SATD), and sum of squared transformed differences (SSTD).

30. The apparatus of claim 28, wherein the analyzing means applies at least one spatial error concealment algorithm used by a corresponding decoding module.

31. The apparatus of claim 27, wherein the analyzing means includes:
means for analyzing information associated with one or more of the plurality of blocks of pixels to determine whether the blocks of pixels can be reconstructed at the desired fidelity using the spatial error concealment algorithm; and
means for identifying, as the excluded blocks of pixels that can be reconstructed at the desired fidelity using the spatial error concealment algorithm, blocks of pixels that can be sufficiently interpolated.

32. The apparatus of claim 31, wherein the analyzing means includes:
means for determining a directional structure in pixel data of the blocks of pixels; and
means for identifying, as the excluded blocks of pixels that can be reconstructed at the desired fidelity using the spatial error concealment algorithm, blocks of pixels that have a consistent directional structure.

33. The apparatus of claim 25, wherein:
the inter-coding means inter-codes a first subset of the blocks of pixels of the inter-coded frame using temporal predictive coding; and
the intra-coding means intra-codes a second subset of the blocks of pixels of the inter-coded frame and intra-codes the channel switch frame to include the multimedia data corresponding to one or more of the blocks of pixels of the first subset of the blocks of pixels of the inter-coded frame without coding the multimedia data corresponding to one or more of the blocks of pixels of the second subset of the blocks of pixels of the inter-coded frame.

34. The apparatus of claim 25, wherein:
the inter-coding means inter-codes a first subset of the blocks of pixels of the inter-coded frame using temporal predictive coding; and
the intra-coding means intra-codes a second subset of the blocks of pixels of the inter-coded frame and intra-codes, for the channel switch frame, the multimedia data corresponding to one or more of the blocks of pixels of the second subset of the blocks of pixels of the inter-coded frame at a reduced quality relative to the multimedia data included by the channel switch frame corresponding to one or more of the blocks of pixels of the first subset of the blocks of pixels of the corresponding inter-coded frame.

35. The apparatus of claim 25, wherein the inter-coded frame and the channel switch frame comprise a first inter-coded frame and a first channel switch frame, and further wherein:
the inter-coding means inter-codes a second frame of multimedia data; and
the intra-coding means intra-codes a second channel switch frame that comprises at least a portion of the multimedia data coded in the second inter-coded frame, wherein the second channel switch frame is coded to exclude one or more blocks of pixels of the second inter-coded frame that can be reconstructed at the desired fidelity using the spatial error concealment algorithm.

36. The apparatus of claim 35, wherein the first channel switch frame codes a first slice of the multimedia data coded in the first inter-coded frame and the second channel switch frame codes a second slice of the multimedia data coded in the second inter-coded frame.

37. A computer-program product for processing multimedia data comprising a non-transitory computer readable storage medium having instructions thereon, the instructions comprising:

code for inter-coding a frame of multimedia data, wherein the inter-coded frame includes a plurality of blocks of pixels; and code for intra-coding a channel switch frame that comprises at least a portion of the multimedia data coded in the inter-coded frame, wherein the channel switch frame is coded to exclude one or more of the plurality of blocks of pixels of the inter-coded frame that can be reconstructed at a desired fidelity using a spatial error concealment algorithm.

38. The computer-program product of claim 37, wherein code for intra-coding the channel switch frame comprises code for intra-coding the channel switch frame to include a slice of the multimedia data coded in the inter-coded frame.

39. The computer-program product of claim 37, further comprising code for analyzing one or more of the plurality of blocks of pixels to identify the excluded blocks of pixels that can be reconstructed at the desired fidelity using the spatial error concealment algorithm.

40. The computer-program product of claim 39, wherein the code for analyzing one or more of the plurality of blocks of pixels comprises:

code for applying the spatial error concealment algorithm to reconstruct one or more of the plurality of blocks of pixels;

code for computing a difference metric between each of the plurality of reconstructed blocks of pixels and a corresponding one of the plurality of blocks pixels of the inter-coded frame; and code for identifying, as the excluded blocks of pixels that can be reconstructed at the desired fidelity using the spatial error concealment algorithm, blocks of pixels with corresponding difference metrics that are less than or equal to a threshold.

41. The computer-program product of claim 40, wherein the code for computing the difference metrics comprises code for computing one of a sum of absolute differences (SAD), a sum of squared differences (SSD), sum of absolute transformed differences (SATD), and sum of squared transformed differences (SSTD).

42. The computer-program product of claim 40, wherein the code for applying the at least one spatial error concealment algorithm comprises code for applying at least one spatial error concealment algorithm used by a corresponding decoding module.

43. The computer-program product of claim 39, wherein the code for analyzing one or more of the plurality of blocks of pixels further comprises:

code for analyzing information associated with one or more of the plurality of blocks of pixels to determine whether the blocks of pixels can be reconstructed at the desired fidelity using the spatial error concealment algorithm; and code for identifying, as the excluded blocks of pixels that can be reconstructed at the desired fidelity using the spatial error concealment algorithm, blocks of pixels that can be sufficiently interpolated.

44. The computer-program product of claim 43, wherein:

the code for analyzing information associated with one or more of the plurality of blocks of pixels comprises code for determining a directional structure in pixel data of the blocks of pixels; and the code for identifying comprises code for identifying, as the excluded blocks of pixels that can be reconstructed at the desired fidelity using the spatial error concealment algorithm, blocks of pixels that have a consistent directional structure.

45. The computer-program product of claim 37, wherein:

code for inter-coding the one or more frames comprises code for inter-coding a first subset of the blocks of pixels of the inter-coded frame using temporal predictive coding and code for intra-coding a second subset of the blocks of pixels of the inter-coded frame; and code for intra-coding the portion of the channel switch frame comprises code for intra-coding the channel switch frame to include the multimedia data corresponding to one or more of the blocks of pixels of the first subset of the blocks of pixels of the inter-coded frame without coding the multimedia data corresponding to one or more of the blocks of pixels of the second subset of the blocks of pixels of the inter-coded frame.

46. The computer-program product of claim 37, wherein:

the code for inter-coding the one or more frames comprises code for inter-coding a first subset of the blocks of pixels of the inter-coded frame using temporal predictive coding and code for intra-coding a second subset of the blocks of pixels of the inter-coded frame; and the code for intra-coding the portion of the channel switch frame comprises code for intra-coding the multimedia data corresponding to one or more of the blocks of pixels of the second subset of the blocks of pixels of the inter-coded frame at a reduced quality relative to the multimedia data included by the channel switch frame corresponding to one or more of the blocks of pixels of the first subset of the blocks of pixels of the corresponding inter-coded frame.

47. The computer-program product of claim 37, wherein the inter-coded frame and the channel switch frame comprise a first inter-coded frame and a first channel switch frame, and further comprising:

code for inter-coding a second frame of multimedia data; and code for intra-coding a second channel switch frame that comprises at least a portion of the multimedia data coded in the second inter-coded frame, wherein the second channel switch frame is coded to exclude one or more blocks of pixels of the second inter-coded frame that can be reconstructed at the desired fidelity using the spatial error concealment algorithm.

48. The computer-program product of claim 47, wherein the first channel switch frame codes a first slice of the multimedia data coded in the first inter-coded frame and the second channel switch frame codes a second slice of the multimedia data coded in the second inter-coded frame.

49. A method for processing multimedia data, the method comprising:

obtaining a plurality of coded frames of multimedia data associated with a first channel, wherein the plurality of coded frames include an inter-coded frame and a channel switch frame, the channel switch frame comprising intra-coded multimedia data that corresponds to at least a portion of the multimedia data coded in the inter-coded frame, and wherein the channel switch frame is coded to exclude one or more of the plurality of blocks of pixels of the inter-coded frame that can be reconstructed at a desired fidelity using at least one spatial error concealment algorithm;

in response to an event, decoding blocks of pixels of the channel switch frame corresponding to the intra-coded multimedia data; and reconstructing one or more excluded blocks of pixels of the inter-coded frame not coded within the channel switch frame using the at least one spatial error concealment algorithm.

50. The method of claim 49, further comprising:
receiving a request to switch from a second channel to the first channel; switching from the second channel to the first channel; and
decoding the blocks of pixels of the channel switch frame of the first channel in response to the request.

51. The method of claim 49, further comprising:
decoding the inter-coded frame;
detecting corruption within one of the coded and the decoded data of the inter-coded frame that results in the reconstructed block of pixels having a fidelity that is less than a desired fidelity; and
decoding blocks of pixels of the channel switch frame of the first channel in response to detecting the corruption.

52. The method of claim 49, wherein the inter-coded frame comprises a first subset of blocks of pixels that are inter-coded and a second subset of blocks of pixels that are intra-coded, the method further comprising:
decoding one or more of the intra-coded blocks of pixels of the second subset of blocks of the inter-coded frame; and
combining the decoded intra-coded blocks of pixels of the inter-coded frame, the decoded blocks of pixels of the channel switch frame, and the reconstructed blocks of pixels of the channel switch frame to generate a decoded frame of data.

53. The method of claim 52, wherein reconstructing the one or more excluded blocks of pixels of the inter-coded frame not coded within the channel switch frame comprises reconstructing the excluded blocks of pixels of the inter-coded frame that are not coded within the channel switch frame and not intra-coded in the inter-coded frame using the spatial error concealment algorithm based on at least one of the decoded blocks of pixels of the channel switch frame and the decoded intra-coded blocks of pixels of the inter-coded frame.

54. The method of claim 49, wherein the inter-coded frame comprises a first subset of blocks of pixels that are inter-coded and a second subset of blocks of pixels that are intra-coded, the method further comprising decoding one or more of the intra-coded blocks of pixels of the second subset of blocks of the inter-coded frame to increase a quality of the corresponding blocks of pixels of the channel switch frame.

55. The method of claim 49, wherein the plurality of coded frames includes at least one inter-coded frame that follow the channel switch frame, and further comprising decoding the inter-coded frame following the channel switch frame without reference to any coded frames preceding the channel switch frame.

56. The method of claim 49, wherein the channel switch frame comprises a first channel switch frame, the method further comprising receiving a second channel switch frame.

57. An apparatus for processing multimedia data, the apparatus comprising one or more processors and memory configured to implement:
a selective decoding module that obtains a plurality of coded frames of multimedia data associated with a first channel, wherein the plurality of coded frames include an inter-coded frame and a channel switch frame, the channel switch frame comprising intra-coded multimedia data that corresponds to at least a portion of the multimedia data coded in the inter-coded frame and in response to an event, decodes the channel switch frame corresponding to the intra-coded multimedia data, wherein the channel switch frame is coded to exclude one or more of the plurality of blocks of pixels of the inter-coded frame that can be reconstructed at a desired fidelity using at least one spatial error concealment algorithm; and a spatial error concealment module that reconstructs one or more excluded blocks of pixels of the inter-coded frame not coded within the channel switch frame using the at least one spatial error concealment algorithm.

58. The apparatus of claim 57, wherein the selective decoding module receives a request to switch from a second channel to the first channel, switches from the second channel to the first channel, and decodes the blocks of pixels of the channel switch frame of the first channel in response to the request.

59. The apparatus of claim 57, wherein the selective decoding module decodes the inter-coded frame, detects corruption within one of the coded or the decoded data of the inter-coded frame that results in the reconstructed block of pixels having a fidelity that is less than a desired fidelity, and decodes blocks of pixels of the channel switch frame of the first channel in response to detecting the corruption.

60. The apparatus of claim 57, wherein:
the inter-coded frame comprises a first subset of blocks of pixels that are inter-coded and a second subset of blocks of pixels that are intra-coded; and
the selective decoding module decodes one or more of the intra-coded blocks of pixels of the second subset of blocks of the inter-coded frame and combines the decoded intra-coded blocks of pixels of the inter-coded frame, the decoded blocks of pixels of the channel switch frame, and the reconstructed blocks of pixels of the channel switch frame to generate a decoded frame of data.

61. The apparatus of claim 60, wherein the spatial error concealment module reconstructs the excluded blocks of pixels of the inter-coded frame that are not coded within the channel switch frame and not intra-coded in the inter-coded frame using the spatial error concealment algorithm based on at least one of the decoded blocks of pixels of the channel switch frame and the decoded intra-coded blocks of pixels of the inter-coded frame.

62. The apparatus of claim 57, wherein:
the inter-coded frame comprises a first subset of blocks of pixels that are inter-coded and a second subset of blocks of pixels that are intra-coded
the selective decoding module decodes one or more of the intra-coded blocks of pixels of the second subset of blocks of the inter-coded frame to increase a quality of the corresponding blocks of pixels of the channel switch frame.

63. The apparatus of claim 57, wherein the plurality of coded frames includes at least one inter-coded frame that follow the channel switch frame, and the selective decoding module decodes the at least one inter-coded frame following the channel switch frame without reference to any of the coded frames preceding the channel switch frame.

64. The apparatus of claim 57, wherein the channel switch frame comprises a first channel switch frame, and the plurality of coded frames include a second channel switch frame.

65. An apparatus for processing multimedia data, the apparatus comprising:
one or more processors and memory configured to implement:

means for obtaining a plurality of coded frames of multimedia data associated with a first channel, wherein the plurality of coded frames include an inter-coded frame and a channel switch frame, the channel switch frame comprising intra-coded multimedia data that corresponds to at least a portion of the multimedia data coded in the inter-coded frame, and wherein the channel switch frame is coded to exclude one or more of the plurality of blocks of pixels of the inter-coded frame that can be reconstructed at a desired fidelity using at least one spatial error concealment algorithm;

means for decoding, in response to an event, blocks of pixels of the channel switch frame corresponding to the intra-coded multimedia data; and means for reconstructing one or more excluded blocks of pixels of the inter-coded frame not coded within the channel switch frame using the at least one spatial error concealment algorithm.

66. The apparatus of claim 65, further comprising:
means for receiving a request to switch from a second channel to the first channel;
means for switching from the second channel to the first channel; and
wherein the decoding means decodes the blocks of pixels of the channel switch frame of the first channel in response to the request.

67. The apparatus of claim 65, wherein the decoding means decodes the inter-coded frame, detects corruption within one of the coded and the decoded data of the inter-coded frame that results in the reconstructed block of pixels having a fidelity that is less than a desired fidelity, and decodes blocks of pixels of the channel switch frame of the first channel in response to detecting the corruption.

68. The apparatus of claim 65, wherein the inter-coded frame comprises a first subset of blocks of pixels that are inter-coded and a second subset of blocks of pixels that are intra-coded, the decoding means decodes one or more of the intra-coded blocks of pixels of the second subset of blocks of the inter-coded frame and combines the decoded intra-coded blocks of pixels of the inter-coded frame, the decoded blocks of pixels of the channel switch frame, and the reconstructed blocks of pixels of the channel switch frame to generate a decoded frame of data.

69. The apparatus of claim 68, wherein the reconstructing means reconstructs the excluded blocks of pixels of the inter-coded frame that are not coded within the channel switch frame and not intra-coded in the inter-coded frame using the spatial error concealment algorithm based on at least one of the decoded blocks of pixels of the channel switch frame and the decoded intra-coded blocks of pixels of the inter-coded frame.

70. The apparatus of claim 65, wherein the inter-coded frame comprises a first subset of blocks of pixels that are inter-coded and a second subset of blocks of pixels that are intra-coded, the decoding means decodes one or more of the intra-coded blocks of pixels of the second subset of blocks of the inter-coded frame to increase a quality of the corresponding blocks of pixels of the channel switch frame.

71. The apparatus of claim 65, wherein the plurality of coded frames includes at least one inter-coded frame that follows the channel switch frame, and wherein the decoding means decodes the inter-coded frame following the channel switch frame without reference to any coded frames preceding the channel switch frame.

72. The apparatus of claim 65, wherein the channel switch frame comprises a first channel switch frame, the obtaining means obtains a second channel switch frame.

73. A computer-program product for processing multimedia data comprising a non-transitory computer readable storage medium having instructions thereon, the instructions comprising:
code for obtaining a plurality of coded frames of multimedia data associated with a first channel, wherein the plurality of coded frames include an inter-coded frame and a channel switch frame, the channel switch frame comprising intra-coded multimedia data that corresponds to at least a portion of the multimedia data coded in the inter-coded frame, and wherein the channel switch frame is coded to exclude one or more of the plurality of blocks of pixels of the inter-coded frame that can be reconstructed at a desired fidelity using at least one spatial error concealment algorithm;
code for decoding, in response to an event, blocks of pixels of the channel switch frame corresponding to the intra-coded multimedia data; and
code for reconstructing one or more excluded blocks of pixels of the inter-coded frame not coded within the channel switch frame using the at least one spatial error concealment algorithm.

74. The computer-program product of claim 73, wherein the instructions further comprise:
code for receiving a request to switch from a second channel to the first channel;
code for switching from the second channel to the first channel; and
code for decoding the blocks of pixels of the channel switch frame of the first channel in response to the request.

75. The computer-program product of claim 73, wherein the instructions further
comprise:
code for decoding the inter-coded frame;
code for detecting corruption within one of the coded and the decoded data of the inter-coded frame that results in the reconstructed block of pixels having a fidelity that is less than a desired fidelity; and
code for decoding blocks of pixels of the channel switch frame of the first channel in response to detecting the corruption.

76. The computer-program product of claim 73, wherein the inter-coded frame comprises a first subset of blocks of pixels that are inter-coded and a second subset of blocks of pixels that are intra-coded, the instructions further comprising:
code for decoding one or more of the intra-coded blocks of pixels of the second subset of blocks of the inter-coded frame; and
code for combining the decoded intra-coded blocks of pixels of the inter-coded frame, the decoded blocks of pixels of the channel switch frame, and the reconstructed blocks of pixels of the channel switch frame to generate a decoded frame of data.

77. The computer-program product of claim 76, wherein the code for reconstructing the one or more excluded blocks of pixels of the inter-coded frame not coded within the channel switch frame comprises code for reconstructing the excluded blocks of pixels of the inter-coded frame that are not coded within the channel switch frame and not intra-coded in the inter-coded frame using the spatial error concealment algorithm based on at least one of the decoded blocks of pixels of the channel switch frame and the decoded intra-coded blocks of pixels of the inter-coded frame.

78. The computer-program product of claim 73, wherein the inter-coded frame comprises a first subset of blocks of pixels that are inter-coded and a second subset of blocks of pixels that are intra-coded, the instructions further comprising code for decoding one or more of the intra-coded blocks of pixels of the second subset of blocks of the inter-coded frame to increase a quality of the corresponding blocks of pixels of the channel switch frame.

79. The computer-program product of claim 73, wherein the plurality of coded frames includes at least one inter-coded frame that follows the channel switch frame, and the instructions further comprising code for decoding the inter-coded frame following the channel switch frame without reference to any coded frames preceding the channel switch frame.

80. The computer-program product of claim 73, wherein the channel switch frame comprises a first channel switch frame, and further comprising instructions that cause the computer to receive a second channel switch frame.

* * * * *